United States Patent
Danieli

(10) Patent No.: US 7,437,409 B2
(45) Date of Patent: Oct. 14, 2008

(54) LIMITING INTERACTION BETWEEN PARTIES IN A NETWORKED SESSION

(75) Inventor: Damon V. Danieli, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 10/461,304

(22) Filed: Jun. 13, 2003

(65) Prior Publication Data

US 2004/0255032 A1 Dec. 16, 2004

(51) Int. Cl.
*G06F 15/16* (2006.01)
(52) U.S. Cl. .................................. 709/204; 709/229
(58) Field of Classification Search ......... 709/227–229, 709/225, 204, 232
See application file for complete search history.

(56) References Cited

U.S. PATENT DOCUMENTS

| | | | | |
|---|---|---|---|---|
| 6,175,622 | B1* | 1/2001 | Chiniwala et al. | 379/221.09 |
| 6,336,117 | B1* | 1/2002 | Massarani | 707/100 |
| 6,732,157 | B1* | 5/2004 | Gordon et al. | 709/206 |
| 6,750,881 | B1* | 6/2004 | Appelman | 715/733 |
| 6,834,279 | B1* | 12/2004 | Chiang | 707/2 |
| 6,905,414 | B2* | 6/2005 | Danieli et al. | 463/42 |
| 6,944,150 | B1* | 9/2005 | McConnell et al. | 370/352 |
| 7,056,217 | B1* | 6/2006 | Pelkey et al. | 463/43 |
| 7,149,778 | B1* | 12/2006 | Patel et al. | 709/206 |
| 2001/0023449 | A1* | 9/2001 | Clark et al. | 709/231 |
| 2002/0080173 | A1 | 6/2002 | Tagami et al. | |
| 2003/0037112 | A1 | 2/2003 | Fitzpatrick et al. | |
| 2004/0003071 | A1* | 1/2004 | Matthew et al. | 709/223 |
| 2004/0003254 | A1* | 1/2004 | Numao et al. | 713/177 |
| 2004/0006595 | A1* | 1/2004 | Yeh et al. | 709/204 |
| 2004/0201668 | A1* | 10/2004 | Matsubara et al. | 348/14.05 |
| 2004/0228352 | A1* | 11/2004 | Constantinof | 370/395.21 |
| 2006/0161680 | A1* | 7/2006 | Balsevich | 709/245 |

FOREIGN PATENT DOCUMENTS

EP 1206955 5/2002

OTHER PUBLICATIONS

Cao, Pei. "Bloom Filters—the math." Jul. 5, 1998. 6pp. Available http://www.cs.wise.edu/~cao/papers/summary-cache/node8.html.

* cited by examiner

*Primary Examiner*—William C. Vaughn, Jr.
*Assistant Examiner*—Kristie D Shingles
(74) *Attorney, Agent, or Firm*—Lee & Hayes, PLLC

(57) ABSTRACT

Interaction between participants in an online session is controlled by using filters. Each participant in an online session may have lists of other users with whom the participant wants to limit interaction in an online session. Each list is hashed to create a filter for the participant. For blocking, the host of an online session logically ORs the filters of all the participants in a session to create a session filter. An identifier for each of the current participants in an online session is hashed to create a user filter. A host of an online session checks the session filter to determine if a prospective participant is blocked. If not, the user filter is transmitted to the prospective participant to check against a block filter. Mute filters and ghost filters are handled similarly, but limit the interaction of participants in an online session in a different fashion.

64 Claims, 10 Drawing Sheets

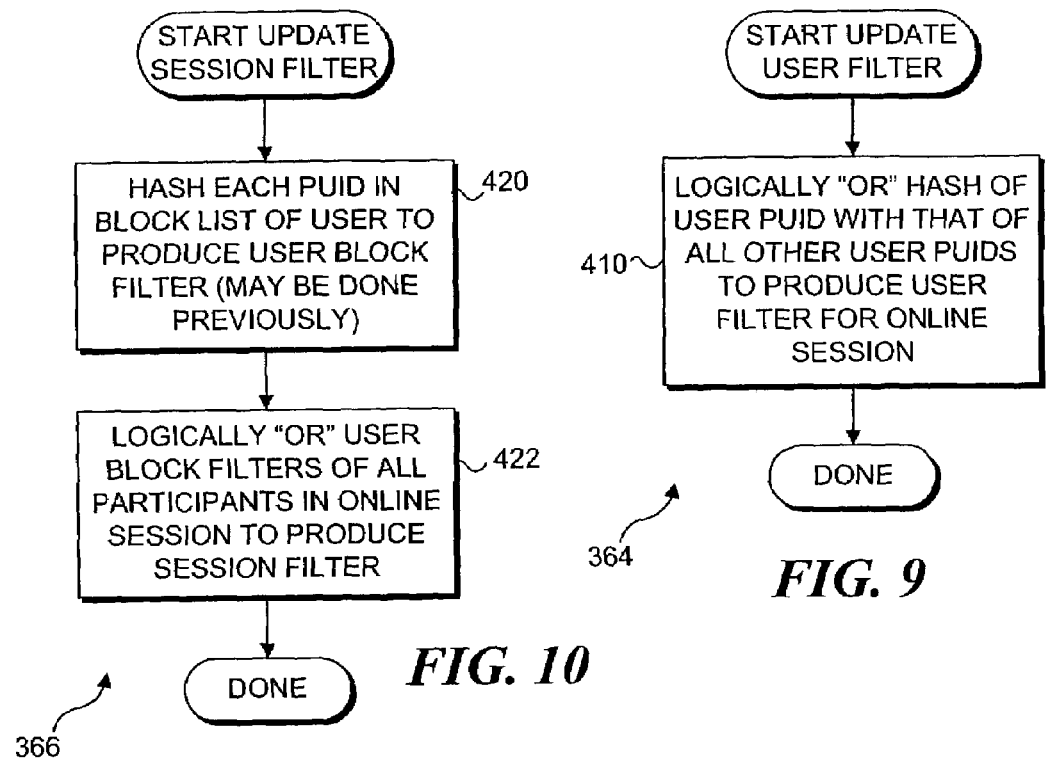
FIG. 10
FIG. 9
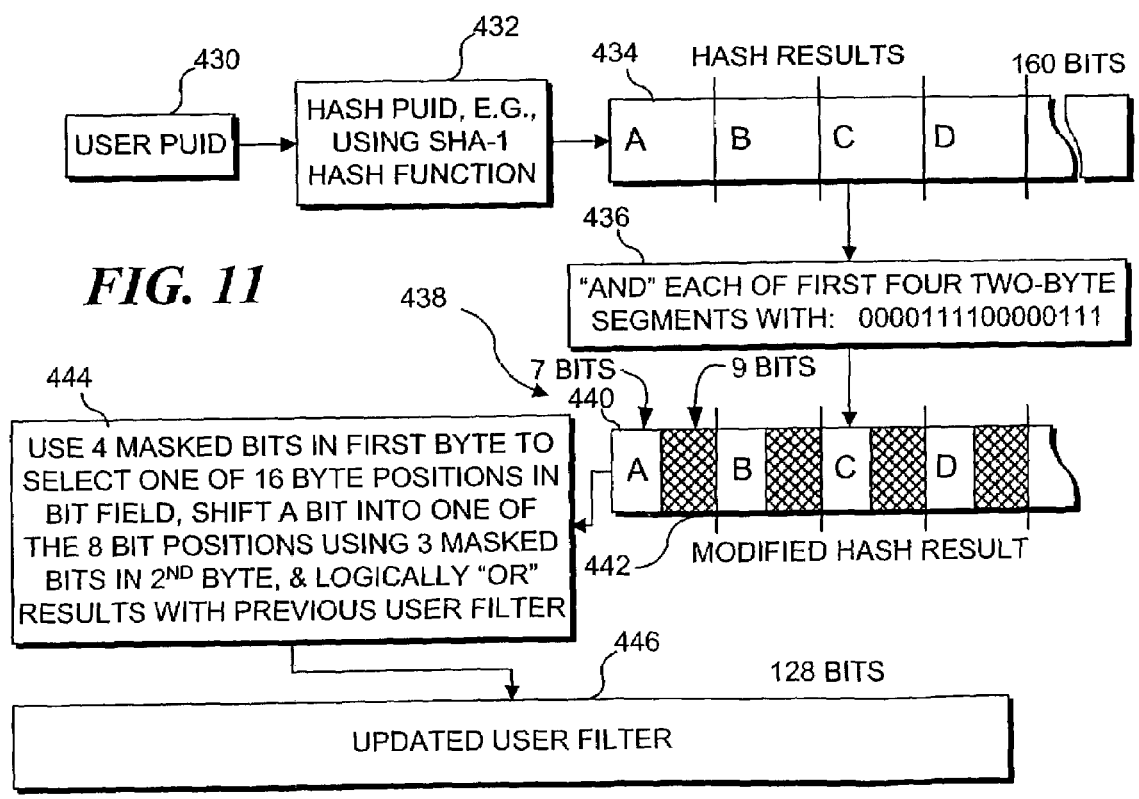
FIG. 11

LIMITING INTERACTION BETWEEN PARTIES IN A NETWORKED SESSION

FIELD OF THE INVENTION

The present invention generally pertains to a technique for controlling the interaction between people in an online session, such as a game, and more specifically, pertains to either blocking and/or ghosting and/or muting a person with whom participants in the online session do not want to interact in response to the result of comparing a filter that includes data representing each such person with corresponding data representing a prospective participant.

BACKGROUND OF THE INVENTION

When playing a non-electronic game with one or more other people, there is typically much social interaction that adds to the enjoyment of the players. Verbal communication is also an element of game play, since comments made by a player to an opponent during a game can cause the opponent to lose concentration and perform poorly, while comments made to team members can provide encouragement, thereby promoting their quality of play. Communication and other forms of interaction between persons playing games are thus clearly important elements of the gaming experience.

The verbal repartee between players that is so important to game play has become an important element in electronic games played over the Internet and other network links. Players at different sites are now able to verbally communicate with each other using techniques similar to those developed to convey voice over the Internet or other networks (i.e., voice over IP). Much of the functionality and many of the techniques of voice over IP are applicable to and have been used in schemes to enable verbal communications over a network between players of electronic games. The verbal communication greatly adds to the enjoyment of playing games over the Internet or other networks. Systems can operate in peer-to-peer mode, in which voice data are transferred over the network directly between computing devices, or may employ a voice server to receive the voice data from one game player computer and forward the data over the network to one or more other computers connected to the network for playing the game.

In contrast to a personal computer (PC) game system in which only one player is supported on each PC, a multiplayer game console supports a plurality of players on each console. Voice communication systems have been developed for game consoles that enable verbal communications between a plurality of players who are playing a game. The verbal communication can be between players on the same game console or between players on different game consoles that are coupled in communication, either directly or over a network, such as the Internet.

While verbal communication during game play is generally a desirable feature, if abused or misused by a specific player, it may become bothersome to one or more other players in a game. The cause of the annoyance to a player may be the repeated use of profanity or sexually explicit language by the specific player, or may simply be language or comments that a player feels to be socially unacceptable. Since each player has an individual reaction to certain verbal behavior, the causes for a player to be annoyed by the verbal communication with a specific player are virtually unlimited. Nevertheless, it will be important to enable any player who becomes annoyed with the verbal communication of a specific player to prevent further verbal communications and/or other types of interaction with that specific other player.

In addition to voice communication, participants in an online session can interact in other ways. For example, a first player in a virtual environment or game may affect the state of a second player in the environment as a result of some act (or failure to act) by the first player. Players in a games often interact in combat or other adversarial struggles, since many games are based on some form of competition between the players. In massive multiplayer games, a player who has acted in a manner that another player finds unacceptable may participate without interacting with the other player most of the time, but it should be possible to prevent or limit the interaction, so that one player is not visible to the other, and/or is unable to affect the state of the other player. In online sessions with smaller numbers of participants, it may be preferable to block the player objected to from participating, although simply controlling or limiting the interaction between the players is still a viable alternative.

It should therefore be possible for a person to block another party perceived as objectionable from participating in a game or other type of online session in which the person is a participant, or to "ghost" another party viewed as objectionable, by preventing communication (voice, video, or chat), or other types of interaction with the other party in an online game or session. In unidirectional ghosting, the person who ghosts another party deemed objectionable should be aware of and/or capable of determining that the ghosted party is present, but ghosted parties should not be able to perceive that they have been ghosted and should not be aware that a ghosting person is present in the online session. In bidirectional ghosting, neither the ghosted party nor the ghosting person should be aware of or capable of determining that the other is present. Similarly, if bidirectional blocking is permitted, a prospective participant should be unable to join a game or other type of online session if a blocked party is already a participant. The prior art does not provide any mechanism to enable a player to anonymously block or ghost an annoying player in a specific game played over a network, particularly in massive multiplayer games, where the number of players and the potentially large lists of blocked/ghosted players has been viewed as creating too great a complexity to implement.

Accordingly, there is a clear need for a technique that enables blocking and/or ghosting and/or muting to be implemented in online sessions without causing an undue burden in the implementation of these goals. The concept is not limited to online games, but instead, should also be applicable to many other types of online sessions in which there is interaction between participants, such as in voice and text chat sessions, networked telephone communications, peer-to-peer networking, etc.

SUMMARY OF THE INVENTION

The present invention was developed to provide an efficient technique for controlling the interaction between participants in an online session. Although initially applied to participants in online games, the present invention is also clearly applicable to controlling interaction between participants in other types of online sessions. The technique is applicable in determining whether a prospective player who wants to join a session should be blocked because the prospective player is included in a blocking list of one or more of the people who are already participants in the game, or in controlling the interaction of players in a multiplayer game. The technique can thus be applied in online sessions, such as virtual environment worlds where many players are participants, by enabling an objectionable player to be ghosted relative to a player who finds the other player's behavior objectionable. For example, when a participant in an online session is ghosted by another player, the ghosting player can be aware of the ghosted player, while the ghosted player is not aware of and does not interact in any way with the ghosting player.

In the method applied in the present invention, each participant and prospective participant in online sessions can have a block list, and/or a mute list, and/or a ghost list that includes a unique identifier for each person with whom the participant wants to limit interaction in an online session. The method employs steps that simplify the determination of whether a prospective participant (or a specific participant in a massive multiplayer session) is on one or more of these lists of any of the participants in the online session, and the determination of whether any of the participants are on one or more of these lists of the prospective participant (or specific participant). Appropriate actions are taken if either condition exists. Various types of limitations on the interactions between participants are contemplated. For example, the limited interaction can result in a ghosted participant being invisible to a ghosting participant, or can prevent communication between the parties, or can prevent a blocked party from even joining a session.

More specifically, in accord with the present invention, a method for limiting an interaction between participants in an online session includes the step of creating a session filter that includes bits set to indicate the results of applying a plurality hashing function to indicators for people whose participation in the online session is to be limited. The hashing functions are also applied to an indicator of a prospective (or current) participant in the online session to determine a test result. The test result is then compared to the session filter to determine if bits defined in the test result have been set in the session filter, and if so, an interaction of the prospective (or current) participant with at least one of the participants in the online session is limited.

As noted above, the step of limiting can comprise the step of blocking the prospective participant from participating in the online session. Alternatively, the step of limiting can include the step of ghosting the prospective participant in regard to at least one of the participants in the online session, when the prospective participant begins to participate in the online session, i.e., is about to interact with a participant who has blocked the prospective participant. As a further alternative, the step of limiting can include the step of muting communication between the participants, is one is on the mute list of the other.

In regard to blocking, the method further includes the steps of creating a user filter that includes bits set to indicate results of applying the plurality of hashing functions to indicators of participants in the online session, and creating a user block filter that includes bits set to indicate results of applying the hashing functions to indicators of people with whom the prospective participant wants to limit interaction during the online session (i.e., by not participating in an online session in which the listed person is a participant or preventing the listed person from joining an online session in which the user is already a participant). The bits set in the user block filter are then compared with those in the user filter to determine if a person with whom the prospective participant wants to limit interaction is included among the participants in the online session. Ghost filters and/or mute filters are similarly created to indicate other participants in an online session with whom interaction is to be limited.

If the prospective participant has not been precluded from participating, and if any person with whom the prospective participant wants to limit interaction is included among the participants, the method can enable the prospective participant to selectively determine whether to participate in the online session, or seek another online session.

If any person with whom a participant wants to limit interaction is included among the other participants, the method can alternatively include the step of ghosting the participant in regard to said person during the online session. As noted above, blocking or ghosting can be applied either unidirectionally or bidirectionly. When ghosted, a participant can be invisible and unable to interact with or change the state of the environment of the ghosting participant, or can appear without any distinguishing information but be able to affect the state of the environment of the ghosting participant.

Another aspect of the present invention is directed to a memory medium having machine instructions for carrying out the steps of the method discussed above. Still another aspect is directed to a system that implements machine instructions stored in the memory of one or more computing devices with the processors of the computing devices, to carry out functions generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 5:
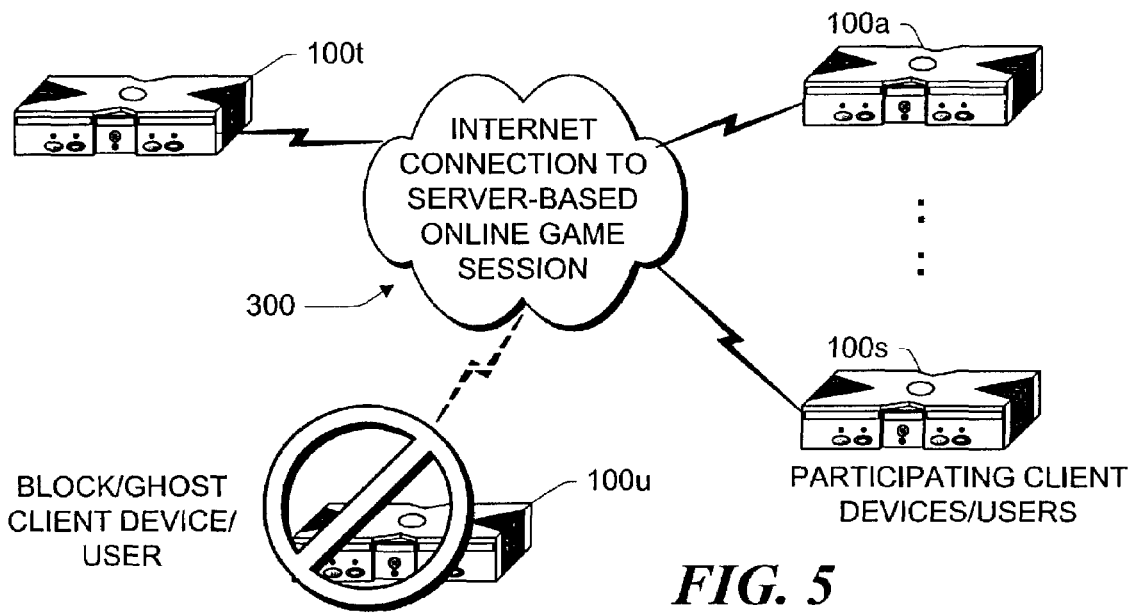
Figure 6:
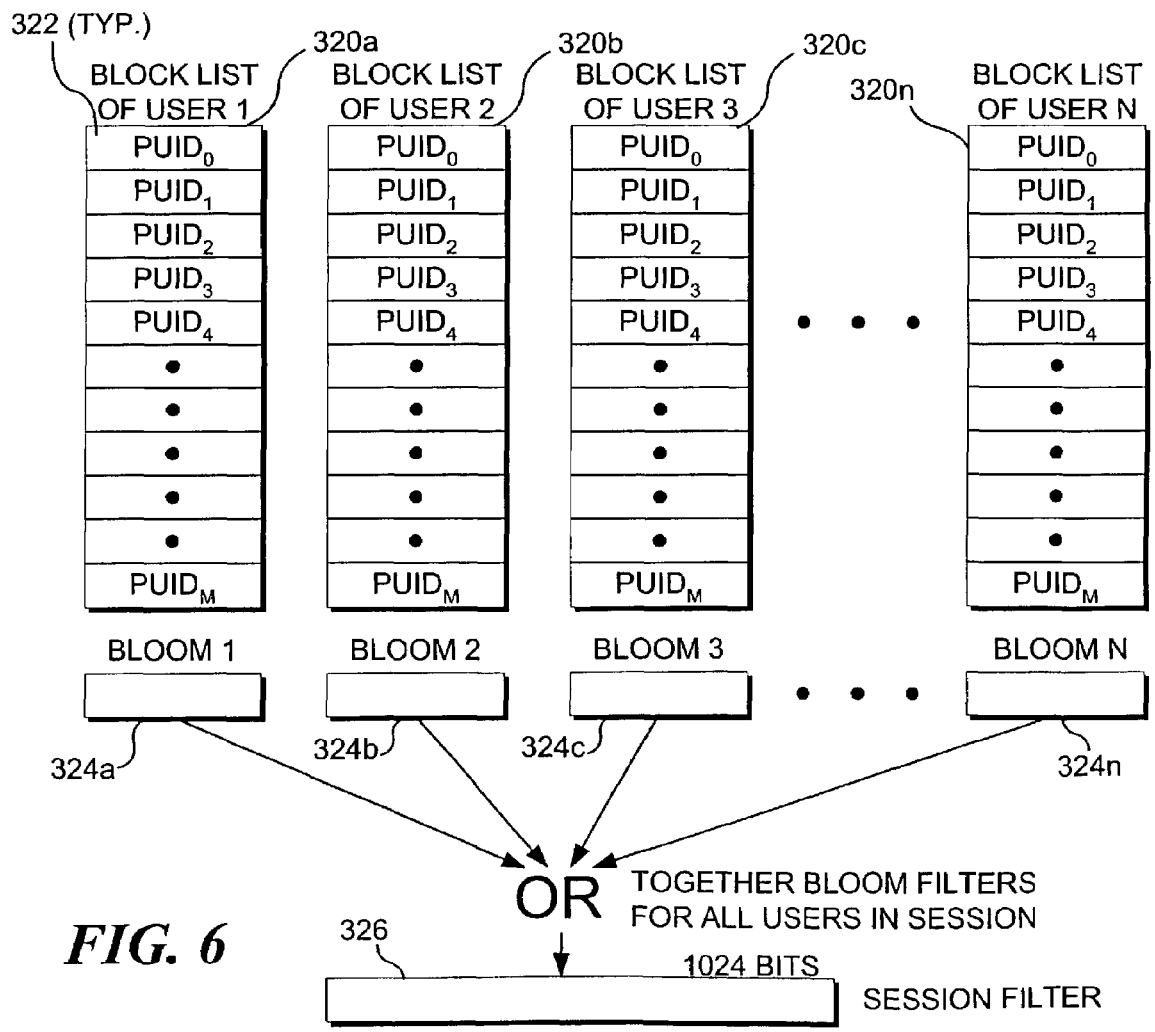
Figure 7:
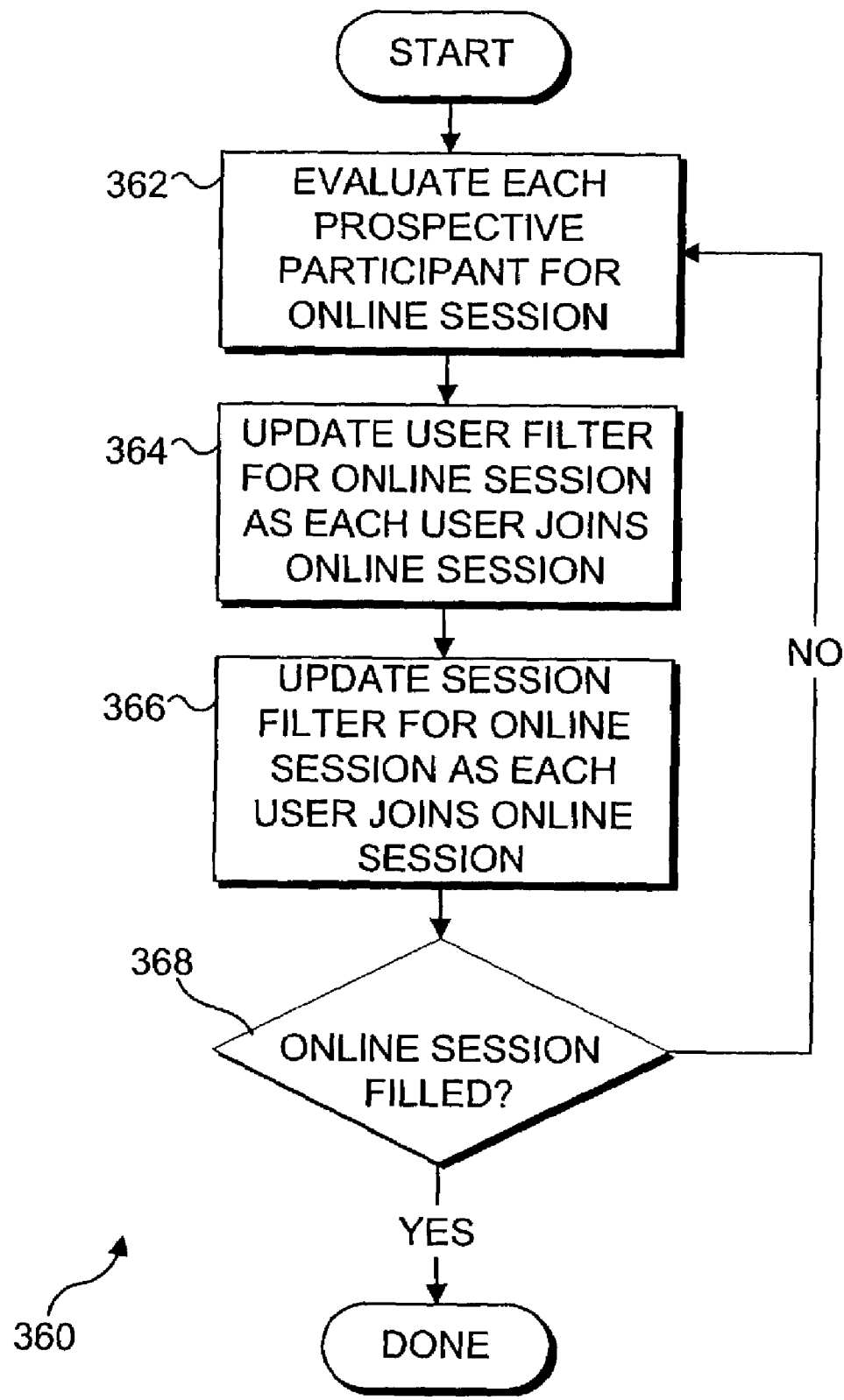
Figure 8:
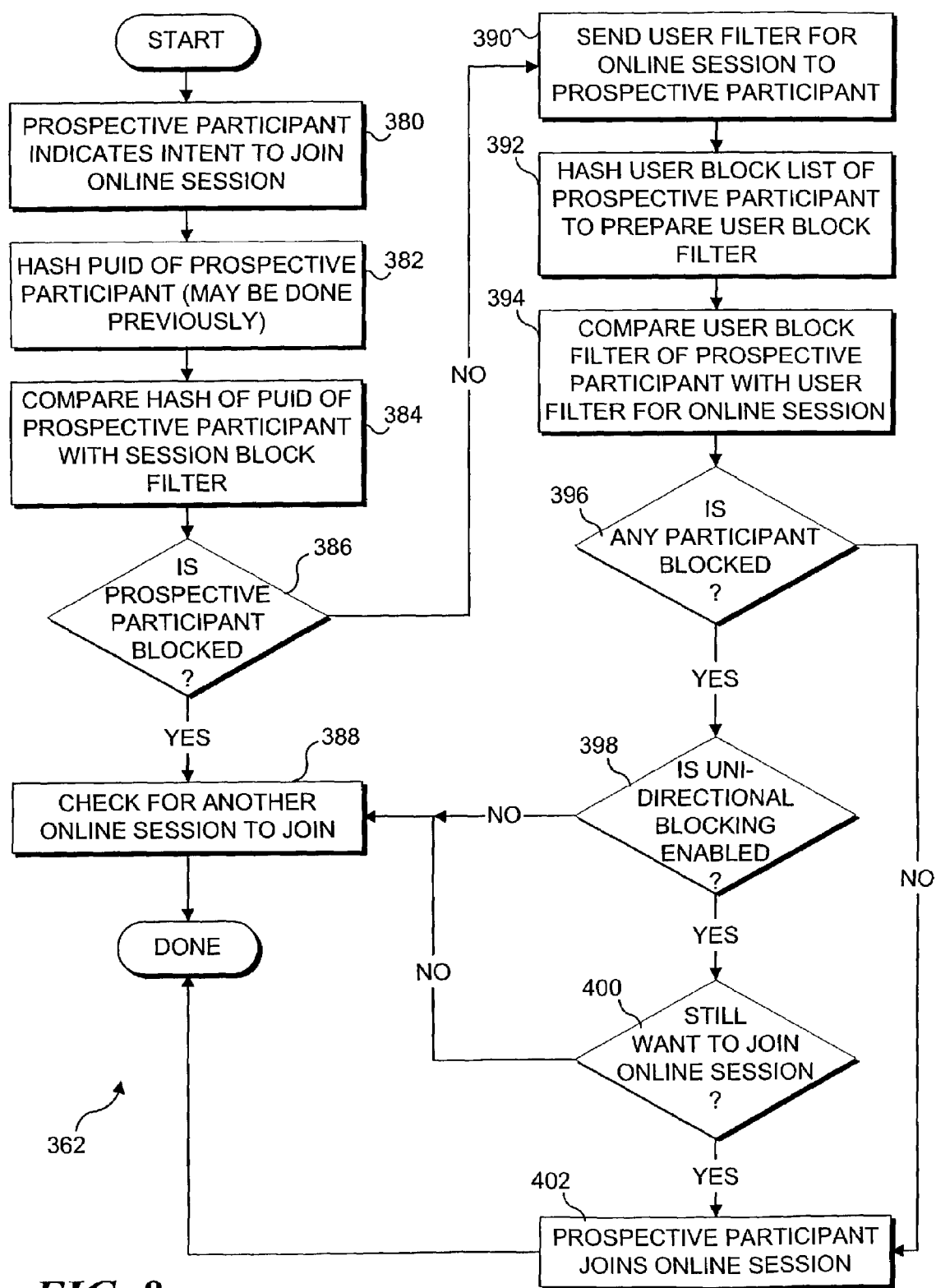
Figure 12:
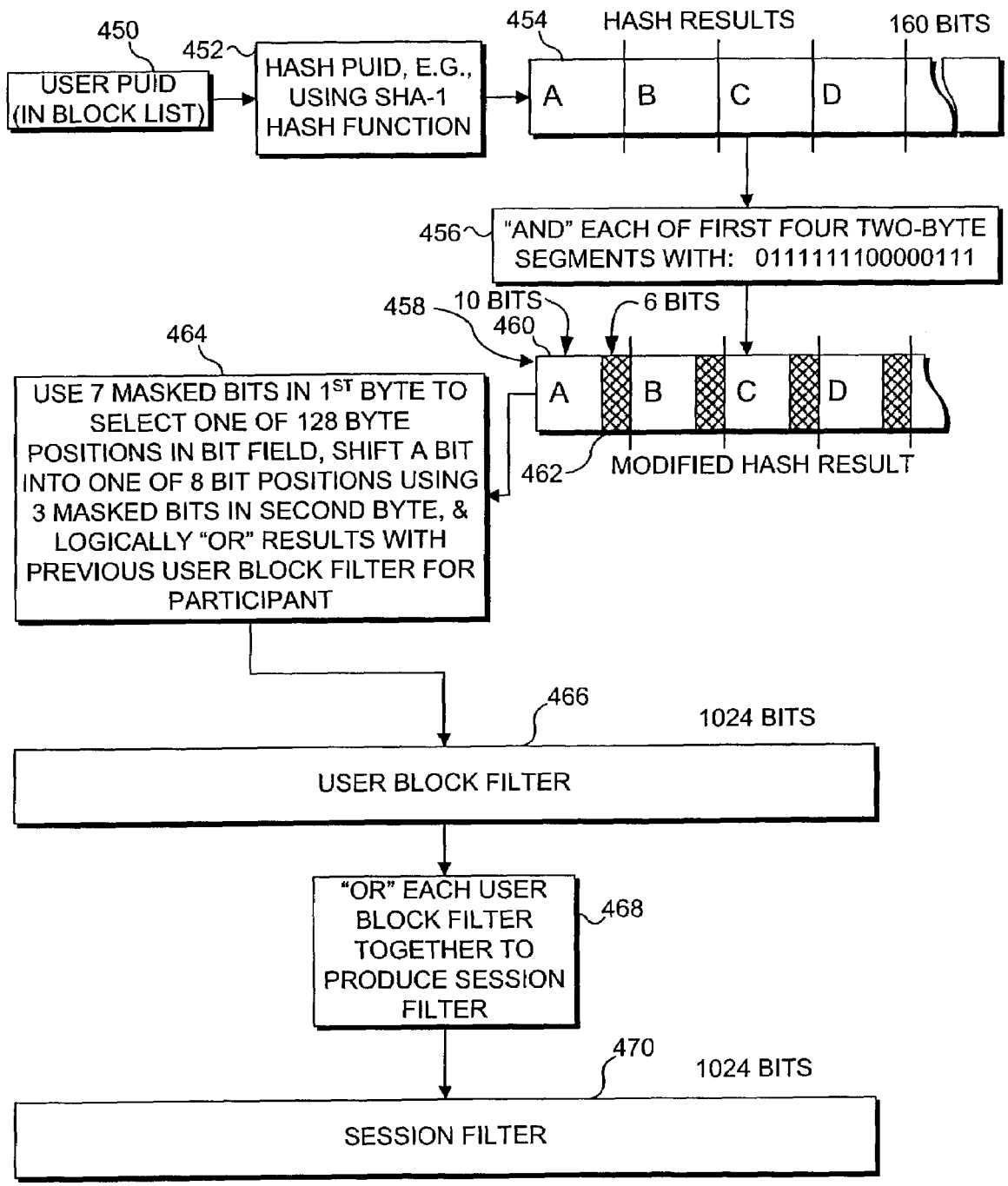
Figures 13, 14:
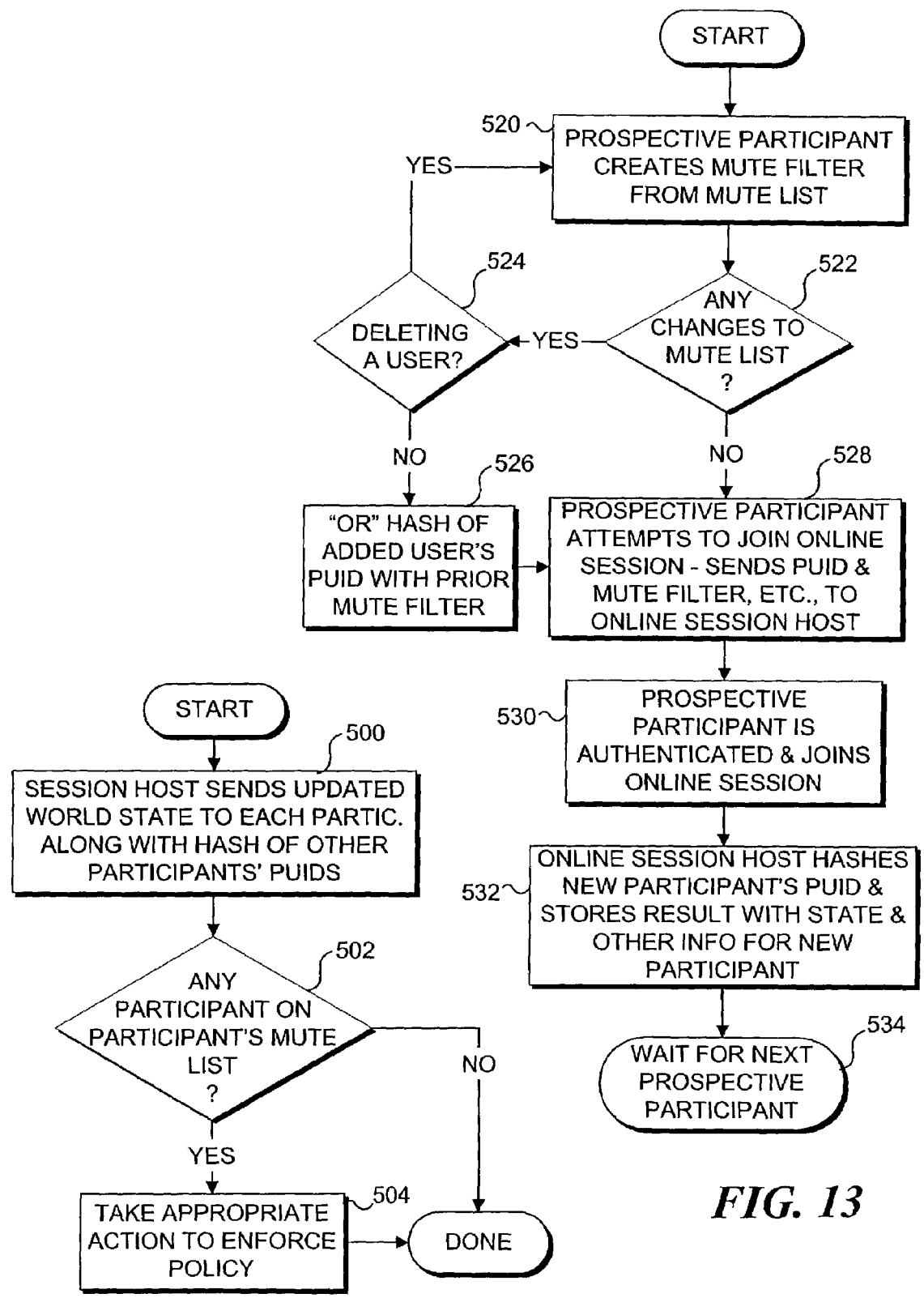
Figure 15:
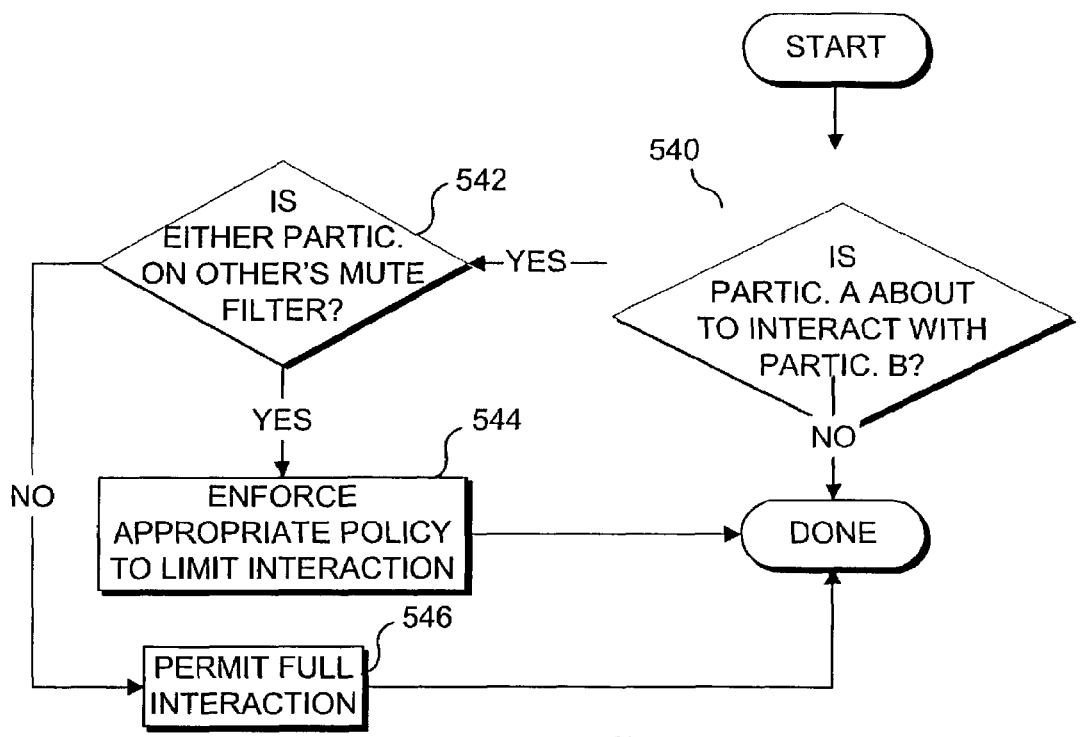
Figure 16:
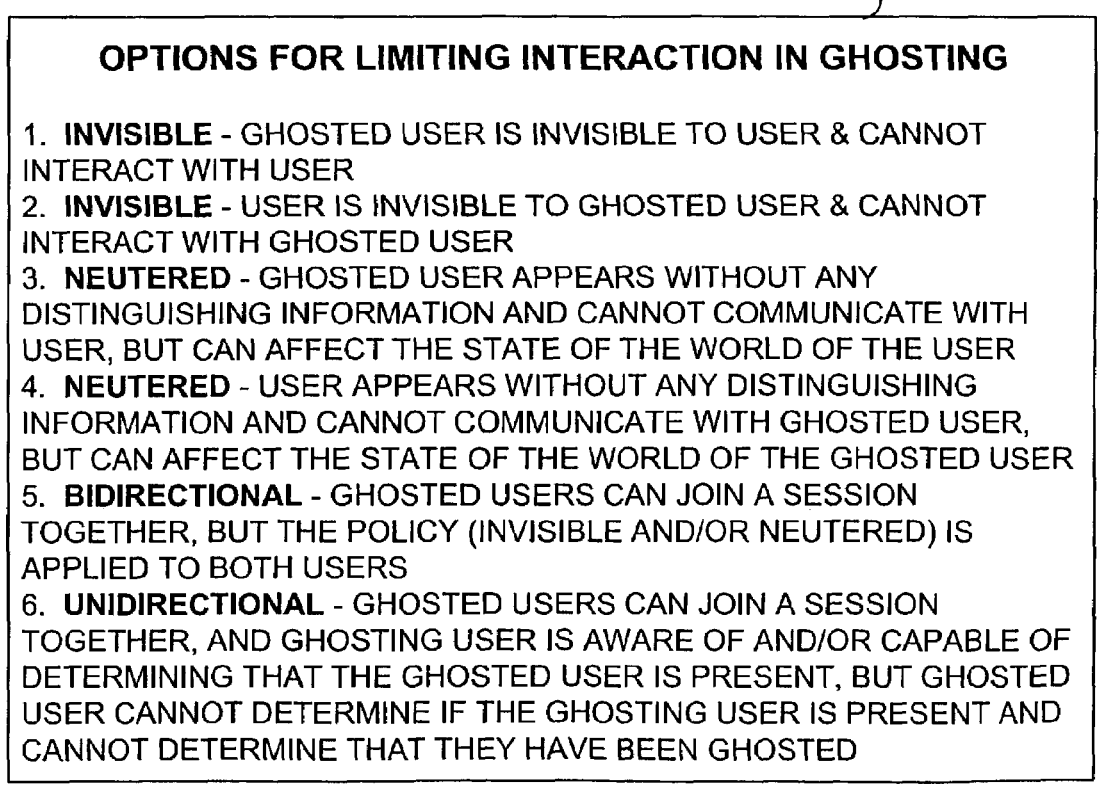

FIG. 5 illustrates a server-based online game session in which a plurality of client computing devices are coupled together and showing that the present invention is applied to prevent a client computing device from joining the online game FIG. 6 illustrates how Bloom filters derived from block lists of a plurality of users in an online session are logically ORed together to produce a session filter, in accord with the present invention;

FIG. 7 is a flowchart broadly illustrating the steps implemented in the present invention to determine if a prospective participant is permitted to join an online session;

FIG. 8 is a more detailed flowchart illustrating the logic applied to determine if a prospective participant is permitted to join an online session;

FIG. 9 illustrates the step for updating a user filter in accord with the present invention;

FIG. 10 is a flowchart illustrating the steps for updating a session filter, in accord with the present invention;

FIG. 11 is a block diagram showing how a user filter is generated in the present invention;

FIG. 12 is a block diagram showing the process for generating a session filter in the present invention;

FIG. 13 is a flowchart illustrating the logical steps implemented in a server-side implementation of muting or ghosting in accord with the present invention;

FIG. 14 is a flowchart illustrating the logical steps for implementing muting or ghosting on a system in which the user or client implements the policy for limiting interaction;

FIG. 15 is a flowchart illustrating the logical steps for determining when to limit interaction (i.e., muting or ghosting) between participants in an online session; and FIG. 16 is a table that lists the various options for limiting the interaction between participants in an online session, in ghosting.

DESCRIPTION OF THE PREFERRED EMBODIMENT

Exemplary System for Implementing Present Invention

Figure 1:
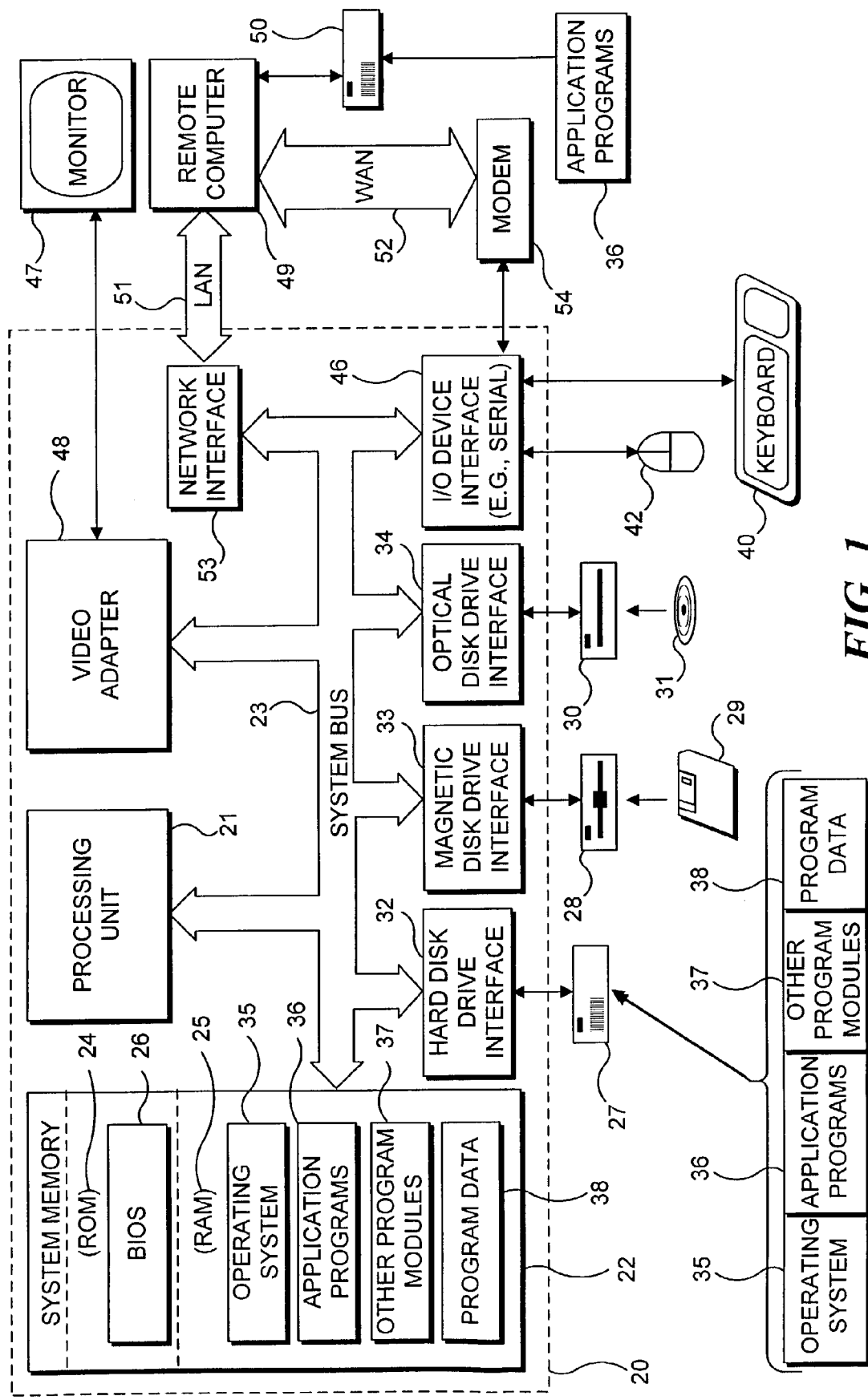
FIG. 1 is a functional block diagram of a generally personal computer (PC), which is suitable for practicing the present invention.

With reference to FIG. 1, an exemplary system suitable for implementing various portions of the present invention, including providing the functionality of a server in a gaining service such as Microsoft Corporation's XBOX LIVE™, or operating as a client computing device that is used to connect to an online session. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into PC 20, and provide control input through input devices such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48. In addition to the monitor, PCs are often coupled to other peripheral output devices (not shown), such as speakers (through a sound card or other audio interface—not shown) and printers.

PC 20 can operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical collections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links. One or more servers employed to provide a gaming service functions will typically comprise one or more computing devices much like that described above, but may access much larger hard drives or other non-volatile memory systems for storing data about subscribing users and for other elements of the gaming service.

Exemplary Game Console

Figure 2:
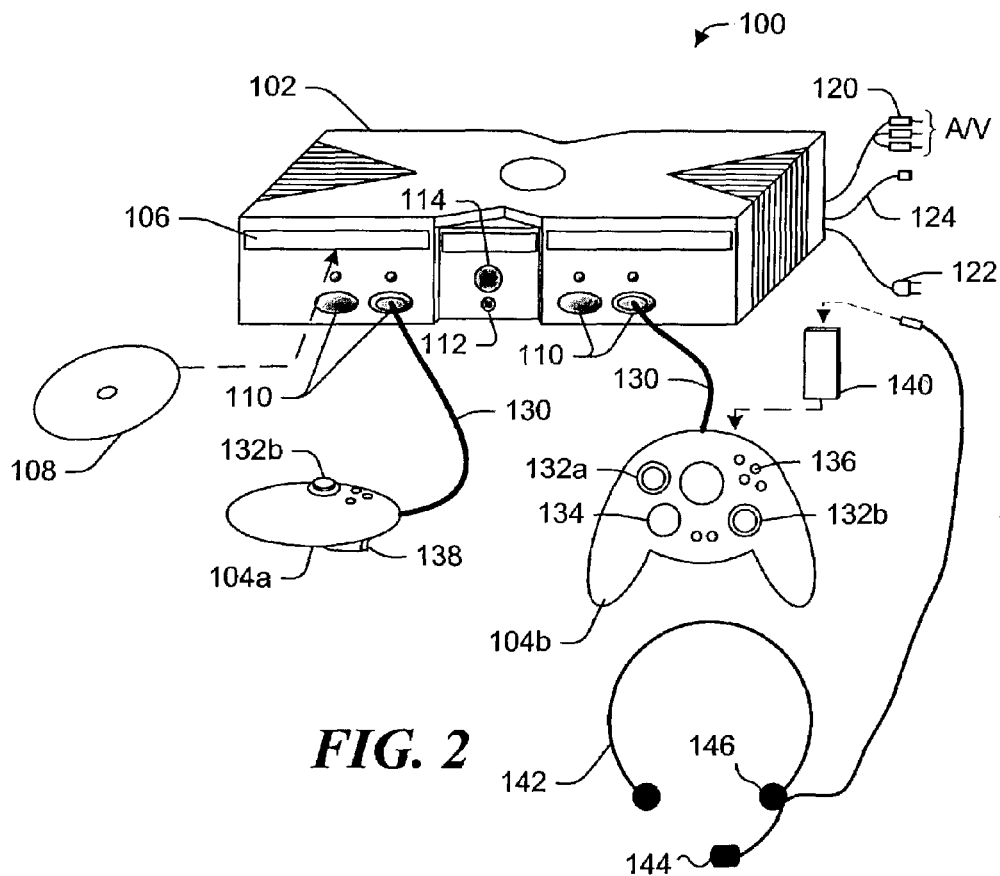
FIG. 2 is a block diagram showing a plurality of computing devices, such as electronic gaming devices or PCs coupled together in communication to form a network in which the present invention can be implemented.

The present invention can be employed in connection with limiting interaction between participants in a service that connects a variety of computing devices together in an online session. One type of computing device that will be used in such an online session is a game console. As shown in FIG. 2, an exemplary electronic gaming system 100 includes a game console 102 and support for up to four user input devices, such as controllers 104a and 104b. Game console 102 is equipped with an internal hard disk drive (not shown in this Figure) and a portable media drive 106 that supports various forms of portable optical storage media, as represented by an optical storage disk 108. Examples of suitable portable storage media include DVD disks and CD-ROM disks. In this gaming system, game programs are preferably distributed for use with the game console on DVD disks, but it is also contemplated that other storage media might instead be used, or that games and other programs can be downloaded from a gaming site over the Internet (or other network).

On a front face of game console 102 are four connectors 110 that are provided for electrically connecting to the controllers. It is contemplated that other types of connectors or wireless connections might alternatively be employed. A power button 112 and a disk tray eject button 114 are also positioned on the front face of game console 102. Power button 112 controls application of electrical power to the game console, and eject button 114 alternately opens and closes a tray (not shown) of portable media drive 106 to enable insertion and extraction of storage disk 108 so that the digital data on it can be read and loaded into memory or stored on the hard drive for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 may be further provided with a data connector 124 to transfer data through an Ethernet connection to a network and/or through a broadband connection to the Internet. Alternatively, it is contemplated that a modem (not shown) may be employed to transfer data to a network and/or the Internet. As yet a further alternative, the game console can be directly linked to another game console via an Ethernet cross-over cable (not shown).

Each controller 104a and 104b is coupled to game console 102 via a lead (or, alternatively, through a wireless interface). In the illustrated implementation, the controllers are USB compatible and are connected to game console 102 via USB cables 130. Game console 102 may be equipped with any of a wide variety of user devices for interacting with and controlling the game software. As illustrated in FIG. 2, each controller 104a and 104b is equipped with two thumb sticks 132a and 132b, a D-pad 134, buttons 136, and two triggers 138. These controllers are merely representative, and other gaming input and control mechanisms may be substituted for or used in addition to those shown in FIG. 2, for controlling game console 102.

Removable function units or modules can optionally be inserted into controllers 104 to provide additional functionality. For example, a portable memory unit (not shown) enables users to store game parameters and port them for play on another game console by inserting the portable memory unit into a controller on the other console. Other removable function units are available for use with the controller. For example, a removable function unit comprising a voice communicator module 140 is employed to enable a user to verbally communicate with other users locally and/or over a network. Connected to voice communicator module 140 is a headset 142, which preferably includes a boom microphone 144 or other type of audio sensor that produces an input signal in response to incident sound, and a headphone 146 or other type of audio transducer for producing audible sound in response to an output signal from the game console. It is further contemplated (but not shown), that the voice communicator capability can be included as an integral part of a controller that is generally like controllers 104a and 104b in other respects. The controllers illustrated in FIG. 2 are configured to accommodate two removable function units or modules, although more or fewer than two modules may instead be employed.

Gaming system 100 is of course capable of playing games, but can also play music and videos on CDs and DVDs. It is contemplated that other functions can be implemented by the game controller using digital data stored on the hard disk drive or read from optical storage disk 108 in drive 106, or from an online source, or from a function unit or module.

Functional Components of the Game Console

Figure 3:
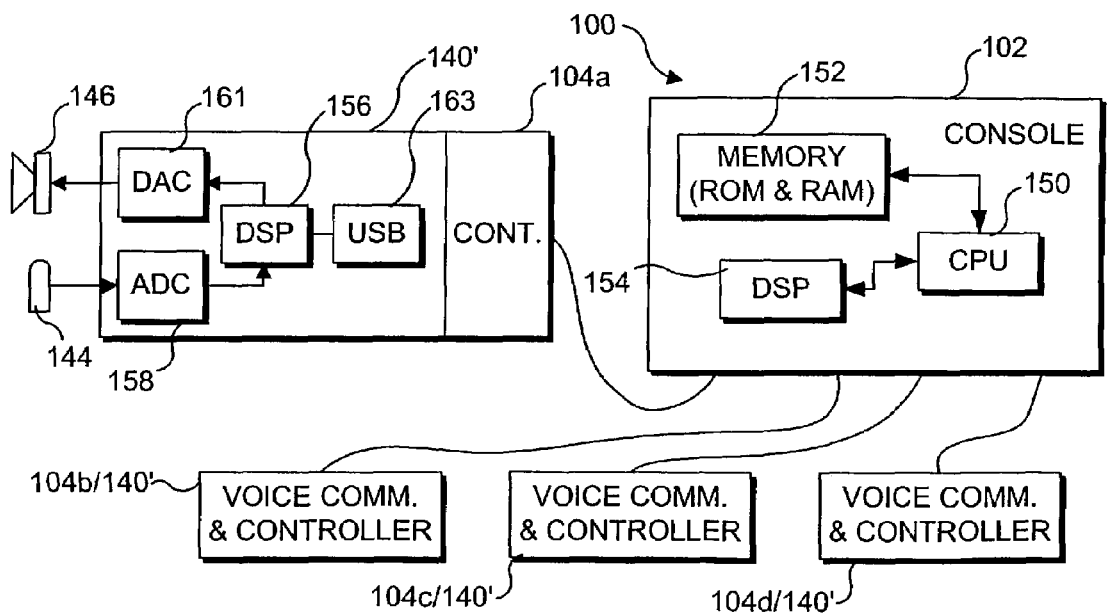
FIG. 3 is a block diagram of a game console and voice communication module suitable for use in an online gaming session in which the present invention is employed.

Turning now to FIG. 3, a functional block diagram illustrates, in an exemplary manner, components of the game console and components that are provided to facilitate voice or verbal communication between players during the play of electronic games on the multiplayer game console. As noted above, this embodiment of game console 100 can have up to four players on each console, and each player can be provided with a controller and voice communicator. Details of a voice communicator module 140' are illustrated in connection with its associated controller 104a. It will be understood that controllers 104b, 104c, and 104d (if coupled to game console 100) can optionally each include a corresponding voice communication module 140' like that coupled to controller 104a. Preferably, voice communication module 140' includes a digital signal processor (DSP) 156, an analog-to-digital converter (ADC) 158, a digital-to-analog converter (DAC) 161, and a USB interface 163. Similarly, digital sound data coming from game console 100 are conveyed through controller 104a and applied to USB interface 163, which conveys the digital signal to DSP 156 and onto DAC 161. DAC 161 converts the digital signal into a corresponding analog signal that is used to drive headphone 146.

With reference to multiplayer game console 100, several key functional components are shown, although it should be understood that other functional components are also included, but not shown. Specifically, game console 100 includes a CPU 150, a memory 152 that includes both ROM and RAM. Also provided is a DSP 154. The digital signal produced by ADC 158 in response to the analog signal from microphone 144 is conveyed through controller 104a to CPU 150, which handles encoding of the voice stream signal for transmission to other local voice communication modules and to other game consoles over a broadband connection through an Ethernet port (not shown in FIG. 3) on the game console.

Digital signals conveyed as packets over a direct or network connection are input to CPU 150 through the Ethernet port on game console 100 (or from other voice communication modules and controllers connected to the same game console), and are processed by the CPU to decode data packets to recover digital sound data that are applied to DSP 154 for output mixing. The signal from DSP 154 is conveyed to the intended voice communication module for the player who is the recipient of the voice communication for input through USB interface 163.

Online Session Environment

Figure 4A:
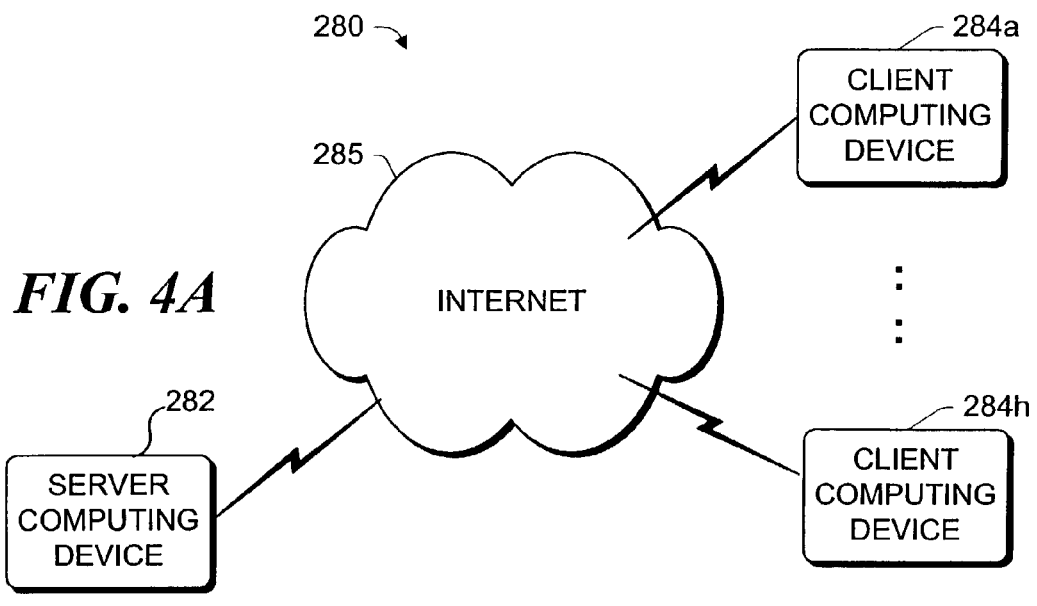
FIG. 4A is a schematic block diagram illustrating an online session in which a plurality of client computing devices are coupled to a server computing device over the Internet.
Figure 4B:
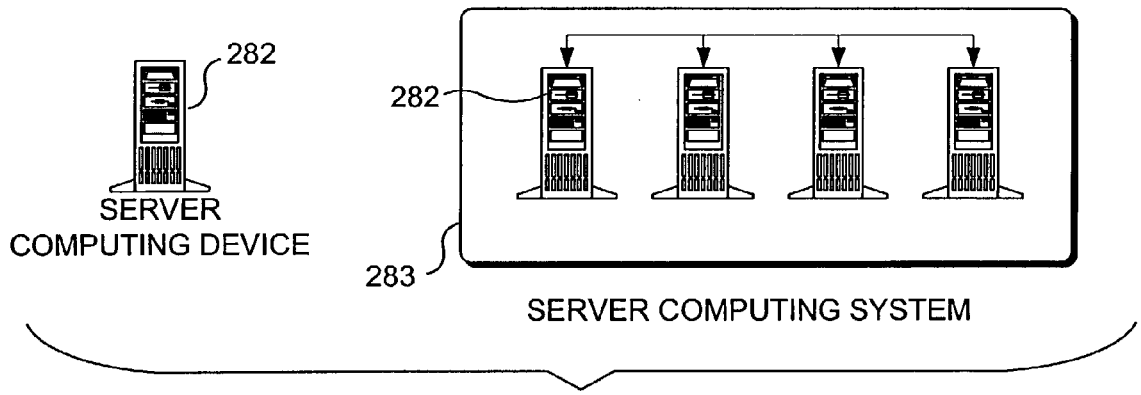
FIG. 4B is a block diagram illustrating that the server can be a single computing device or a plurality of computing device that carryout a server function, when implementing the present invention.

FIGS. 4A and 4B illustrate different aspects of an online session environment. In FIG. 4A, a schematic diagram 280 shows that an exemplary online session environment comprises a plurality of client computing devices or game consoles 284a-284h, which are connected to a server computing device 282. Data packets are conveyed between the server computing device and the game consoles over Internet 285. Each game console 284a-284h is thus connected in communication with server computing device 282, which as shown in FIG. 4B may comprise a single server computing device 282, or alternatively and more likely, will include a plurality 283 of servers 282 that are coupled together to carry out specific functions required for the gaming service.

Figure 4C:
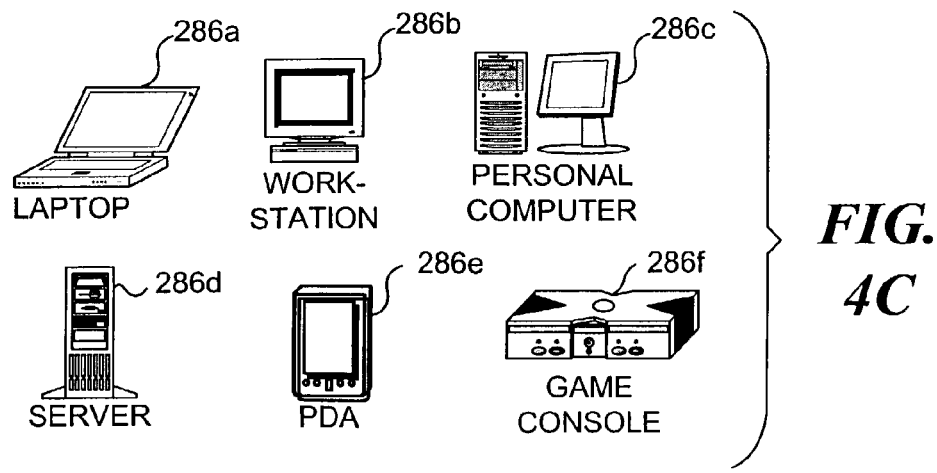
FIG. 4C illustrates a plurality of exemplary computing devices that might be coupled together in communication during an online session in which the present invention is carried out.

A variety of devices that communicate with the Internet can comprise the client computing devices in an online session, as shown in FIG. 4C. Such devices include without limitation, a laptop 286a, a workstation 286b, a PC 286c, a server 286d, a personal data assistant (PDA) 286e, and a game console 286f. A user attempting to participate in an online session can be blocked from doing so by the present invention, or the interaction of that user with specific other participants can be controlled and limited. The approach used in the present invention to determine whether a user connecting with one of the devices shown in FIG. 4C is permitted to join and participate fully in the online session, or to limit and control the interaction of the user with others in the online session is relatively efficient, even when the online session involves very large numbers of participants.

Server-Based Online Game Service

FIG. 5 schematically illustrates a plurality of client computing devices 100a-100u, which are coupled in communication with a server-based game session 300 over the Internet. While not shown, client computing devices 100a-100t can be connected in a plurality of different online sessions with relatively small numbers of players, or alternatively, may be connected in a single massive participant online session with hundreds or even thousands of participants. Thus, FIG. 5 can be thought of as representing a plurality of client computing devices employed by users for connecting in any type of online session in which interaction between users is to be limited in accord with the present invention.

In this particular exemplary application of the present invention to online gaming, a client computing device 100u is employed by a specific user who wants to join an online game session as a participant. However, if the user of client computing device 100u happens to be included within a block list of one of the users already participating in an online game session, the present invention will preclude the user of client computing device 100u from joining that online game session. Alternatively, if the user of client computing device 100u intends to join a massive multiplayer online game session, it may be that the interaction of the player of computing device 100u will be limited in a different fashion, such as by preventing communication between that user and a participant who has included the user of client computing device 100u on a ghost list or a mute list. As explained below, a player who is ghosted can be made invisible or neutered in regard to a person not wishing to interact with that player. If simply muted, the user of client computing device 100u will be unable to communicate with a participant in the online session who has included that user on their mute list. Since the details of the present invention are somewhat involved, the following definition of terms should help clarify the various ways in which the present invention is used to limit interaction between participants in all online session.

Definition of Terms Used in the Present Invention

Session—a logical collection of users into a group over a network. The network can be the Internet, a LAN, a wireless, telephony, or private network, etc. The session can be a gaming session wherein each user participates in a networked multiplayer game, a telephony bridge where users come together to participate in a voice chat session, a text chat conversation, or any other online session in which a plurality of people participate and interact.

Server—A physical machine that runs the online session. For massively multiplayer games, the server will typically comprise a computing device in a data center (for a data-center-hosted online session). Depending upon the session architecture, a single massively multiplayer server can host a portion of the game world (sometimes referred to as a "shard"), the entire game world, or multiple game worlds. Since there is not necessarily a one-to-one correlation between a logical session (as defined above) and a physical server, the term "session" is used in connection with the online session instead of the term "server," although the two terms are sometimes used interchangeably in the art.

Service—Central or distributed processes that provide user authentication, a list of sessions present, the repository of the user policy lists, billing, and other administrative functions.

User—Person, player, or participant in an online session, e.g., a player in a massively multiplayer online session. Although the present invention is explained in connection with players in online games, it will be understood that this exemplary application is not intended to be limiting, and the term "player" can generally be considered to be replaced with any of the other terms noted in the preceding sentence, when understanding the operation of the present invention in other types of online sessions.

Block—A person can be prevented from participating in an online session if the person is indicated in a session filter created by logically ORing block filters produced from block list of the current participants in the online session. Also, if any of the current participants are included in the block list (block filter) of a prospective participant, the prospective participant may either be given an opportunity to join the session anyway, or may be prevented from joining the online session, depending upon the implementation chosen by the designer of the online session.

Block List—A list of persons with whom a user does not wish to participate within an online session. This list may be stored on a service, on a local hard drive of the user, on the local memory unit of the user, or on any other storage that can store user-specific properties.

Session Filter—A filter (see below) that is created by hashing the block list of each participant in an online session to produce a Bloom filter or block filter for the participant, and then logically ORing the block filters together. The block filter includes bits that are set to indicate each person who should be blocked from participating in the online session and is typically maintained by a host of an online session.

Mute—Where a muting user cannot talk to a muted user and vice versa. Depending upon the implementation, mute may encompass voice chat, text chat and gestural communication. The present invention can employ unidirectional muting (where one user can talk to another but not vice-versa), but this approach will generally not be employed. The preferred practice is to employ bidirectional muting where neither party can communicate with the other if one party is on a mute list of the other, but a muting user sees that the other user has been muted and can toggle the muting on and off. However, the muted user preferably does not see that they have been muted.

Mute List—User-specific persistent list of all users who a person has decided are unacceptable to communicate with in an online session. This list may be stored on the service, on the local hard drive of the person, on a local memory unit of the person, or in any other storage that can store user-specific properties. A mute list is generally analogous to a block list or a ghost list, since each defines one or more users with whom a person has determined that interaction is to be blocked or limited during an online session. While the type of limitation applied is suggested by the term "mute list," "block list," or "ghost list," these terms generally simply define a specific type of limited interaction.

Ghosting—Ghosting is implemented so that a user (typically the ghosting user) does not see the personally-identifying information of the other user (typically the ghosted user). Personally-identifying information includes anything specific and unique to that user. This includes User Name, Personal Name, Personal profile, Icon, etc. There are different permutations of ghosting, and all are valid depending upon the online session designer's choice, which determines the policy that is enforced when a "match" occurs in the mute, block, or ghost list of a person participating in the online session. Depending on implementation, there are two ways to "ghost" a user:

1. Invisible—The ghosted user is invisible to the ghosting user and cannot interact with the ghosting user. Thus, the invisible ghosted user cannot affect any state of the world or environment of the ghosting user.
2. Neutered—The ghosted user who is neutered appears without any distinguishing information and cannot communicate with the ghosting user. However, the ghosted user who is neutered can affect the state of the world of the ghosting user.

The choice of implementing invisible ghosting or neutered ghosting (or both) is up to the designer—both have merits depending upon the mechanics of the game or other type of online session. For example, in a game world where players cannot affect each other's environment, the designer might only implement invisible ghosting. In a game world where players can interact with each other's environment (such as killing monsters together), invisible ghosting would not make sense, because the world state might change (due to an action of an invisible user), which would be puzzling to the other user. In that case, a neutered ghosting implementation would be the more logical choice. Note that these options are not mutually exclusive. A game or online session design might call for neutering one user and making the other user invisible to the one user that is neutered.

Player Ghosting vs. Ghosted—Another choice a designer must make (and both are valid) is whether the ghosting user becomes invisible or neutered to the ghosted user OR if the ghosted user becomes invisible or neutered to the ghosting user. That is, in one implementation (which is probably the more common case), if a first party ghosts a second party, the first party may become invisible to the second party. In another implementation, if the first party ghosts a second party, the second party may become invisible to the first party. Both designs (which also apply to neutering) are valid and the choice of which to implement is left up to the game designer.

Ghost List—User-specific persistent list of all users who are ghosted to the specific user in an online session. This list may be stored on the service, on the local hard drive of the user, on the local memory unit of the user, or any other storage that can store user-specific properties. See the definition of "block list" and "mute list," above.

Bidirectional Ghosting—Where ghosted users can join a session together, but the policy (invisible and/or neutered) is applied to both ghosting and ghosted users.

Unidirectional Ghosting—Where ghosted users can join a session together, but the ghosting user is aware and/or capable of determining that the ghosted user is present, although the ghosted user cannot determine if the ghosting user is present and cannot determine if they have been ghosted.

Filter—A data structure that represents a set of users. This data structure can be in the form of a list of unique user names, unique user ID numbers, or as practiced in a preferred embodiment of the present invention, comprises a structure such as a Bloom filter (described below). The present invention will work using almost any "filter," but the properties of the Bloom filter provide substantial benefits in a preferred form of the present invention.

Bloom Filter—A fixed length bitmap that contains an aggregate indication of a set of users, with no possibility of a false negative (i.e., returning a erroneous indication that a person was not in the set, when the person was), although there is a designable, low probability of a false positive (i.e., of returning an indication that a person was in the set when the person was not). The probability of a false positive can be controlled by manipulating several variables and selecting parameters that represent tradeoffs of memory and CPU, as discussed below.

Online Session Filter

For purposes of determining whether a prospective participant is blocked from joining an online game session, the present invention uses a session filter, as defined above. FIG. 6 illustrates how block lists 320a-320n for each of N participants in an online session are employed to generate a session filter 326. Each block list of a user or participant in an online game session includes a plurality of player-unique identifiers (PUIDs) 322 indicative of those persons with whom the user does not want to interact in an online session. In this case, the block list identifies those users that should not be permitted to participate in an online game session (or other type of online session) in which user 320a-320n is already participating. In the example shown in FIG. 6, it will be evident that each participant in an online session may have from up to M PUIDs 322 within their block list. While this example employs PUIDs as an indicator of the users who should be blocked in regard to a particular participant, it will be evident that other types of identifying indicia may be alternatively used.

When a participant joins the online session, the host of the session, which might be a server if the session is server based, or one of the participants who is acting as a host if it is not, receives a block list of the participant, or alternatively receives a Bloom filter 324a-324n corresponding to the Bloom filter for the block list of those participants. Each Bloom filter can be created by the participant and transmitted to the host of the online session or the host may instead create the Bloom filter for the block list of each new participant who is joining the online session. The host of the online session then creates session filter 326 by logically ORing each of Bloom filters 324a-324n together. The details involved in creating each of Bloom filters 324a-324n are described below. In a more general case, the PUIDs in a block list can be replaced with any globally unique identifier (GUID) for each of the persons that a specific user has chosen to be on the block list and with whom the user does not wish to interact in an online session.

Filter Parameters

Before creating or joining a session, the user's computing device creates a predetermined-length Bloom filter that aggregates all users in the user's block list. Since a uniquely-generated 128-bit number (PUID or GUID) is used to identify each user in a preferred embodiment, numeric processing of this number is possible. Other implementations might have employed any unique data type (name, social security number, user number, etc.) to identify a user. Also, it is contemplated that a central server may aggregate and create the Bloom filter for each user based on that user's block list.

An exemplary implementation sets the length of the Bloom filter to a size that is manageable in memory, yet sufficiently large to reduce the false positive rate to an acceptable level. An example uses:

$$c*b*p \leq m$$

where:
c=small constant (16works well)
b=system wide average number of users in blocked list (e.g., 16 users)
p=maximum number of players in a game session (decided at design time of game)
m=number of bits in the Bloom filter bitmap. This example uses a value for m that is evenly divisible by 8, for segmentation into bytes and which is a power-of-two, for bit optimizations. In practice, a value of m with a size of 1024 bits (128 bytes) has been found sufficient. Once the Bloom filter size has been determined, a segment of memory of size m bits is allocated and set to zero.

Next, k hashing functions are applied to each user in the user block list of a party to generate k single-bit positions in the Bloom filter. The hashing functions are designed to distribute all input across m bits and to be independent from each other.

The optimal number of k (i.e., $k_{opt}$) has been determined by derivation of the probability function to be:

$$k_{opt} = (\ln 2)*(m/(b*p))$$

However, a value for k can be chosen to be less than $k_{opt}$ such that there are fewer hashing functions and so that the probability of false positives is still acceptable.

Preferably, the program running on the user's computing device generates a Secure Hash Algorithm-1 (SHAD-1) hash of each user PUID in a list to determine the bit positions in the Bloom filter that are set. For example, if the Bloom filter is size m, then the first $\log_2(m)$ bits in the SHA-1 digest represent the bit position that are set in the Bloom filter for the $1^{st}$ hash function. The next $\log_2(m)$ bits in the SHA-1 digest represent the bit position that are set for the $2^{nd}$ hash function, etc. The program continues executing on the user's computing device k times, until k bits have been set in the Bloom filter. However, the bits do not have to be unique, because some hashing functions may (with 1/m probability) choose the same bit, which is acceptable in the Bloom filter algorithm.

For clarity, the Bloom filter produced from the user block list is referred to as the block filter and is the 1024-bit filter that aggregates the block list of that user into a single Bloom filter for the user.

As each successive user is allowed to participate in an online session, the block filter of the new participant is bitwise-ORed into the session filter that aggregates the block filters of every participant in the session. The session filter is preferably stored by the session host in this preferred implementation, but can alternatively be stored on (or accessed by) a matchmaking server in alternative implementations, e.g., for peer-peer online sessions.

The host of the online session also creates the user filter, which indicates the participants in the online session, using the same method as described above. The size of the user filter for the participants in the online session is generally smaller that the session filter, and its size is a function of the number of participants in the session and not of the size of their block lists:

$$c*p \leq m$$

where:
c=small constant (e.g., 8)
p=maximum number of players in a game session (which is decided at design time of game or online session)
m=number of bits in the Bloom filter bitmap, e.g., using m having a size of 128 bits (16 bytes) has been found to be sufficient for the exemplary application.

As users join the online session as participants, the host adds the indication of their user PUID to the user filter for the online session, as described above, to update the user filter. The user filter is preferably a 128-bit filter that aggregates all users in the online session into a single Bloom filter.

A user is determined to be indicated in a Bloom filter (with good probability) by passing the user through the SHA-1 hash and checking that each bit position at the $k^{th}$ hash value is set (true) in the Bloom filter. If all bit positions for all hash values are set (true), there is a good probability that this user is indicated in the Bloom filter. But, if any bit position in the hash value is clear (false), then this user is guaranteed not to be in the set (because there are no false negatives in Bloom filters).

Logic Implemented in Present Invention

In FIG. 7, the logical steps implemented by the host of an online session are illustrated in a flowchart 360 in connection with carrying out the present invention. In a step 362, the host evaluates each prospective participant who wants to join the online session. Further details of this step are described below, in connection with FIG. 8. As each new participant joins the online session, as noted in a step 364, the host of the online session next will update the user filter for the online session so that it includes an indication of the new participant (see FIG. 9). Further, in a step 366, the host updates the session filter to include a Bloom filter that was created from the block list of the new participant. Further details of this step are discussed below in regard to FIG. 10. A decision step 368 then provides for determining if the online session is filled, and if not, the host prepares to evaluate the next prospective participant who wishes to join the online session. Alternatively, if the online session is filled, the logic is complete until the online session is no longer active or one of the participants leaves, creating an opening for another prospective participant to join.

Further details of step 362 are illustrated in FIG. 8. As shown therein, in a step 380, a prospective participant indicates an intent to join an online session. The PUID of the prospective participant or other suitable indicator is then hashed in a step 382, using a SHA-1or other suitable one-way hashing function. This step may be carried out by the prospective participant prior to attempting to join the online session, or may be done by the prospective participant at the time of joining, or by the host of the online session when the prospective participant indicates an intention to join the session.

Next, in a step 384, the host of the online session compares the hash of the PUID of the prospective participant with the session block filter that the host is maintaining. During this comparison, if the host finds that any bit that is set in the hash of the PUID of the prospective participant is not also set in the session filter, it is immediately apparent that the prospective participant is not blocked by any of the current participants in the online session. However, if all of the bits of the hash of the PUID of the prospective participant are found in the session filter, there is a relatively high probability (but not a certainty) that this prospective participant has been blocked by at least one of the current participants in the online session. As explained below, this probability can be set to any desired level as a function of the parameters used in creating the Bloom filter for each of the current participant's block list. Thus, decision step 386 indicates that the host determines if the prospective participant is blocked based on the results of this comparison. If so, a step 388 notes that the prospective participant should check for another online session to join, since he is not permitted to join the current online session, and the logic is complete. Alternatively, if the prospective participant is not blocked, the host sends the user filter, which includes an indication of the current participants in the online session, to the prospective participant in a step 390. The prospective participant will have hashed the user block list prepared by the prospective participant to prepare a user block filter, as indicated in a step 392.

In a step 394, the prospective participant compares the user block filter that is produced by hashing the PUID for each member in the user block list of the prospective participant with the user filter received from the host of the online session. If at least one of the bits resulting from the hash of the PUID for any user in the user block list does not appear in the user filter, then that user is not currently a participant in the online session, but if all bits of the hash of the PUID of that user are set in the user filter, there is a high probability that the user is a participant. Thus, based upon the results of this comparison, the prospective participant determines if any current participant of the online session is within the block list of the prospective participant in a decision step 396. If so, a decision step 398 determines if unidirectional blocking is enabled by the designer of the online session. If unidirectional blocking is enabled, the prospective participant is given the option to join the online session even though one of the current participants in the online session is within the prospective participant's block list. Otherwise, the prospective participant is directed to check for another online session to join in step 388. However, if unidirectional blocking is enabled, a decision step 400 determines if the prospective participant still wants to join the online session. If so, a step 402 enables the prospective participant to join the online session and the logic is done. Otherwise, the logic continues again with step 388.

FIG. 9 illustrates the detail of how the user filter is updated by the host of the online session in step 364 of FIG. 7. In a step 410 of FIG. 9, the host logically ORs the hash of the user PUID with the previous user filter, or alternatively, logically Ors the hash of all user PUIDs currently participating in the online session. The result is an updated user filter for the online session. If a user leaves the online session, then the user filter must be created again.

When updating the session filter, as indicated in step 366 of FIG. 7, the details shown in FIG. 10 are carried out. In a step 420 in FIG. 10, the host of the online session applies the hashing function to each PUID in the block list of the new participant in the online session to produce a user block filter. Alternatively, the user block filter may be produced at a previous time by the new participant and transferred to the host of the online session. Next, in a step 422, the host logically ORs the user block filters of all participants in the online session. If updating the user file for a new participant, the host simply logically ORs the new participant user block filter with the previous session filter to produce an updated session filter, but if a user stops participating, then step 422 must be repeated.

FIG. 11 provides further details in regard to creating a user filter 446 by hashing a user PUID 430 of a current participant in an online session. This step is carried out by using a hashing function such as the SHA-1 to hash the user PUID as indicated in a block 432. Although a different number can be used, in an exemplary preferred embodiment illustrated in FIG. 11, the hash of the user's PUID results in bits being set in one or more of four two-byte segments A through D 434. Since the bit field is only 128 bits long, only seven bits in each two-byte segment are used. Accordingly, this exemplary preferred embodiment logically ANDs each of the first four two-byte segments with 0000111100000111, as indicated in a block 436. The 4 least significant bits in the first byte represent the "byte" offset in the 16 byte block. The 3 least significant bits in the second byte represent the bit offset in the 8 bits of that byte. The masking produces an optimal modulo so that further bit operations are not necessary. Block 438 shows that a modified hash results in which seven bits 440 in each segment A-D include one or more bits that are set as a result of the hash, followed by nine bits 442 that are not used in each segment. Next, to generate the user filter for the online session, in a block 444 the host uses the 4 masked bits in the first byte to select one of the 16 byte positions in the bit field, then shifts a bit into one of the 8 bit positions using the 3 masked bits in the second byte, and logically ORs the results with the previous user filter to set the bits representing the PUID for the new participant in the user filter, resulting in an updated user filter 446. Furthermore, as shown in FIG. 12, an analogous series of steps are carried out in generating the session filter. For each user PUID in a block list of each of the participants in the online session as indicated in a block 450, the host hashes the PUID, for example, using the SHA-1 hash function at a step 452. Again, hash results 454 include four two-byte segments in which bits are set as a function of the hash results. Next, at a step 456 each of the four two-byte segments are logically ANDed with 0111111100000111, so that the last six bits in each of the segments are masked, yielding a modified hash result 458 that includes ten bit positions 460 that can be set in each of the four segments and six bits 462 that are masked in each segment. In a block 464, the host uses the 7 masked bits in the first byte to select one of the 128 byte positions in the bit field then shifts a bit into one of the 8 bit positions using the 3 masked bits in the second byte and logically ORs the results with the user block filter previous generated for this participant, to set the bits representing the PUID in the user block filter for the current participant in block 450. The same steps are repeated for each PUID in the participant's block filter, yielding a final user block filter 466 for the participant. For each of the other participants, a corresponding user block filter is also generated. Finally, as indicated in a block 468, the host logically ORs each user block filter together to produce a current session filter 470. As a new participant joins the online session, the user block filter for the new participant is logically ORed with the previous session filter to produce a new session filter that includes an indication of the users who are blocked by the new participant.

Application of Present Invention to Massive Multiplayer Online Games

In contrast to smaller online game sessions in which only a few players are participating, or other types of online gone sessions with limited number of participants, a massive multiplayer game environment or other comparable online game session with many participants will typically not require that a player be blocked from participating simply because the player is included within another participant's block list. Instead, other types of limited interaction will come into play such as the ability to control communication between players based upon a participant being included on another player's mute list or ghost list. In this case, the interaction may involve limiting communication between the two parties, or alternatively, ghosting one of the parties relative to the other, generally as determined by the designer of the online game session. However, it is not intended that the ghost list or mute list only be applicable to an online session with massive numbers of participants, since they can also be applied to online sessions with only a few participants.

FIG. 13 illustrates the steps involved in preventing verbal communication between participants in an online game session or virtual environment, but the steps there are equally applicable to ghosting, or to limiting communication by text or other means. In a step 520, a prospective participant in an online session creates a mute filter from a mute list of the prospective participant. The mute list of a prospective participant includes an identification of each other person with whom the prospective participant does not wish to communicate during an online session. Generally, the same process is used to create the mute filter as is used to create user filter 446, as illustrated in FIG. 11. Referring back to FIG. 13, once a mute filter has been produced from the prospective participant's mute list, it may need to be maintained from time to time. Accordingly a decision step 522 determines if any changes have been made to the mute list. If so, a decision step 524 determines if any change included deleting a user from the mute list. If so, it will be necessary to recreate the mute filter, in accord with step 520. However, if the change is simply adding the identification or PUID for another person to the mute list, a step 526 provides for logically ORing the hash of the added user's PUID with the prior mute filter. This step creates an updated mute filter. Thereafter, or if no change has been made to the mute list of the prospective participant, a step 528 indicates that the prospective participant attempts to join the online session. In doing so, the prospective participant will send his/her PUID or other identifying indicia along with the mute filter that has been created or just updated, to the host of the online session. In most massive multiplayer games or other environments, the host will be server-based, but in a small online session operating in a peer-to-peer environment, the host may equally well be another participant. In a step 530, the host takes the appropriate steps to authenticate the prospective participant, and the prospective participant is enabled to join the online session.

Next, in a step 532, the online session host hashes the PUID for the new participant who has just joined the session (if not already done) and stores the result with the state and other information for the new participant. Thereafter, the host waits for the next prospective participant who will attempt to join at a step 534, and returns to step 528 when a new prospective participant is detected and proceeds as described above.

When enforcing the policy as defined by the developer of the online session, steps are carried out by the host and by each participant in the online session, generally as shown in FIG. 14. As indicated in a step 500, the host continuously sends updated world state information to each participant, along with the hash of the other participants' PUIDs. The updated world state information will typically be dependent upon the nature of the online game session or virtual environment and may include such information as the health of each participant, the position of the participant in the environment, the state of the participant's weaponry or protection or strength, etc. In a decision step 502, each participant will determine if any other participant is on that participant's mute list. If so, in a step 504, appropriate action will be taken to enforce the policy as specified by the designer of the online session. For example, a muting player might block all communication from a muted player. The muting player might have the option of unmuting the muted player. However, the muted player will typically have no indication that the muting player can communicate. If applied to ghosting, the various options for ghosting can be implemented as described otherwise herein, depending upon the designer's determination as to how best to apply ghosting to the virtual environment or other type of online session.

Details of determining when to limit the interaction between parties are illustrated in FIG. 15. In a decision step 540, the host for an online session determines if participant A is about to interact with participant B, and if not, takes no further action. However, if such interaction is about to occur, a decision step 542 provides for determining if either participant is on the other's mute list or indicated by a corresponding mute filter, which is created from the mute list. If not, a step 546 permits full interaction between participant A and participant B, and no further action is required in that regard by the host of the online session. However, if the result of decision step 542 is affirmative, a step 544 provides for enforcing the appropriate policy to limit the interaction between the two participants in the online session. Thereafter, the logic is complete.

A summary of the options for limiting the interaction in ghosting is disclosed in a Table 548, which is shown in FIG. 16. While not specifically set forth in the flowcharts discussed above, it will be apparent that various combinations of the options for limiting interaction as set forth in FIG. 16 in regard to ghosting are possible within an online session, in accord with the present invention. Similarly, various options for muting or controlling communication between players who participate in an online session are also possible within the context of the present invention, as well as the option to block a prospective participant from joining an online session. The present invention thus provides an effective way to control interactions between participants in online sessions, including smaller online sessions as well as online sessions with massive numbers of participants. Use of filters produced from the block user list, mute list, and/or ghost list clearly reduce the amount of data that must be transferred and maintained to keep track of participants in the online session and to identify users who should be blocked, muted, and/or ghosted, based upon the lists of the users in an online session.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention claimed is:

1. A method automatically performed by a computing device for controlling an interaction between participants in an online session, based upon block lists of the participants, wherein a block list of a participant identifies one or more persons with whom interaction with the participant in an online session should be controlled in a specific manner, comprising the steps of:

(a) creating a session block filter from the user block lists of the participants in the online session by bitwise-ORing a plurality of bloom filters of the participants, each of the plurality of bloom filters being a fixed length bitmap that aggregates a user block list of a participant, each user block list of a participant including a unique identifier for each person in said user block list with whom interaction with the participant in the online session is to be controlled in the specific manner, wherein said session block filter is a fixed length bitmap that contains an aggregate indication of all persons identified in the user block lists of all the participants;

(b) creating a user filter that represents all participants in the online session by bitwise-ORing each unique identifier of the participants, each unique identifier being indicative of a participant in the online session, wherein the user filter is a fixed length bitmap that contains an aggregate indication of all current participants in the online session;

(c) comparing the prospective participant with the persons represented in the session block filter for the online session to determine if interaction with any participant in the online session by the prospective participant must be controlled in the specific manner, and if so, taking a first action;

(d) creating a user block filter for the prospective participant to represent persons with whom interaction with the prospective participant in the online session is to be controlled in the specific manner, the creating comprising bitwise-ORing unique identifiers of the persons into the user block filter that is a fixed-length bitmap and contains aggregate indication of all the persons; and (e) comparing the persons indicated in the user block filter of the prospective participant with the user filter for the participants in the online session, to determine if any participant in the online session is included in the user block list of the prospective participant, and if so, taking a second action, said first action and said second action being applied to control an interaction between the prospective participant and participants in the online session.

2. The method of claim 1, wherein the step of taking the first action comprises the step of blocking the prospective participant from participating in the online session.

3. The method of claim 2, wherein the step of taking the second action composes the step of attempting to determine a different online session in which the prospective participant can participate.

4. The method of claim 1, wherein the step of taking the second action is taken only if the first action is not taken and comprises the step of blocking prospective participant from participating in the online session.

5. The method of claim 1, wherein the step of taking the second action is taken only if the first action is not taken and comprises the step of enabling the prospective participant to selectively decide whether to participate in the online session.

6. The method of claim 5, wherein the step of enabling the prospective participant to selectively decide whether to participate occurs only if the prospective participant is otherwise unable to find any other online session in which to participate.

7. The method of claim 1, wherein the step of taking the first action comprises the step of ghosting the prospective participant during the online session in regard to a participant who has included the prospective participant in the user block list of said participant.

8. The method of claim 7, wherein the step of taking the second action comprises the step of ghosting a participant during the online session, in regard to the participant who was included in the user block list of the prospective participant.

9. The method of claim 8, wherein the step of ghosting comprises the step of preventing communication and transfer of identifying information between a ghosted participant and a ghosting participant in the online session.

10. The method of claim 9, further comprising the step of preventing any participant who is ghosted from determining an identification of the ghosting participant.

11. The method of claim 1, wherein the session block filter represents all persons identified in the user block lists of the participants by setting bit positions in the session block filter determined by repetitively applying related but different mathematical functions to the unique identifier for each person in the user block lists; wherein said user filter includes bit positions that are set in the user filter and are determined by repetitively applying the related but different mathematical functions to the unique identifier for each participant in the online session; and, wherein the step of comparing the prospective participant with the persons represent in the session block filter comprises the steps of:

(a) repetitively applying the related but different mathematical functions to a unique identifier of the prospective participant in the online session, to determine corresponding bit positions in the session block filter; and (b) comparing the corresponding bit positions determined for the prospective participant with the bit positions that are set in the session block filter for the online session.

12. The method of claim 11, wherein the related but different mathematical functions comprise hashes.

13. The method of claim 11, wherein the step of comparing the corresponding bit positions determined for the prospective participant is carried out on one of a matchmaking server, a session host, and a computing device that is peer-to-peer with the prospective participant.

14. The method of claim 11, wherein if the corresponding bit positions determined for the prospective participant have been set in the session block filter, there is a substantial probability that the prospective participant was included in a user block bit list of at least one participant in the online session, but if any of the corresponding bit positions determined for the prospective participant are not set in the session block filter, then the prospective participant is definitely not included in any user block list of a participant in the online session.

15. The method of claim 1, further comprising the step of selectively enabling an option to be provided in the online session that permits the prospective participant to join a session even though a participant in the session appears on the user block list of the prospective participant.

16. The method of claim 1, wherein the online session comprises a game that is played by the participants over a network.

17. A memory medium having machine instructions stored therein, for carrying out the steps of claim 1.

18. A system automatically for controlling an interaction between participants in an online session, based upon user block lists of the participants, wherein a user block list of a participant identifies one or more persons with whom interaction with the participant in an online session should be controlled in a specific manner, comprising:

(a) a plurality of computing devices, each computing device being associated with at least one participant in the online session and including a processor coupled with a memory in which are stored machine instructions, said plurality of computing devices each including interface devices that are coupled to the processor therein and connected together in communication to form a network, at least one of the plurality of computing devices being associated with a prospective participant in the online session; and (b) one or more processors in the plurality of computing devices executing the machine instructions stored in corresponding one or more memories thereof, to carry out a plurality of functions, including:

(i) creating a session block filter from the user block lists of the participants in the online session by bitwise-ORing a plurality of bloom filters of the participants, each of the plurality of bloom filters being a fixed length bitmap that aggregates a user block list of a participant, each user block list of a participant including a unique identifier for each person in said user block list with whom interaction with the participant in the online session is to be controlled in the specific manner, wherein said session block filter is a fixed length bitmap that contains an aggregate indication of all persons identified in the user block lists of all the participants;

(ii) creating a user filter that represents all participants in the online session by bitwise-ORing each unique identifier of the participants, each unique identifier being indicative of a participant in the online session, wherein the user filter is a fixed length bitmap that contains an aggregate indication of all current participants in the online session;

(iii) comparing the prospective participant with the persons identified in the session block filter for the online session to determine if interaction controlled any participant in the online session by the prospective participant must be controlled in the specific manner, and if so, taking a first action;

(iv) creating a user block filter for the prospective participant to represent persons with whom interaction with the prospective participant in the aniline session is to be controlled in the specific manner, the creating comprising bitwise-ORing unique identifiers of the persons into the user block filter that is a fixed-length bitmap and contains an aggregate indication of all the persons; and (v) comparing the persons indicated in the user block filter of the prospective participant with the user filter for the participants in the online session, to determine if any participant in the online session is included in the user block list of the prospective participant, and if so, taking a second action, said first action and said second action being applied to control an interaction between the prospective participant and participants in the online session.

19. The system of claim 18, wherein the session block filter is created by a computing device among the plurality of computing devices that is one of:
(a) a matchmaking server computing device for the online session;
(b) a session host computing device for the online session; and
(c) a participant computing device.

20. The system of claim 18, wherein the user block filter is created by a computing device among the plurality of computing devices that is one of
(a) a matchmaking server computing device for the online session;
(b) a session host computing device for the online session; and
(c) a participant computing device.

21. The system of claim 18, wherein taking the first action comprises blocking the prospective participant from participating in the online session.

22. The system of claim 18, wherein taking the second action comprises attempting to determine a different online session in which the prospective participant can participate.

23. The system of claim 18, wherein the second action is taken only if the first action is not taken and comprises the blocking the prospective participant from participating in the online session.

24. The system of claim 18, wherein the second action is taken only if the first action is not taken and comprises enabling the prospective participant to selectively decide whether to participate in the online session.

25. The system of claim 24, wherein the prospective participant is enabled to selectively decide whether to participate only if the prospective participant is otherwise unable to find any other online session in which to participate.

26. The system of claim 18, the first action comprises ghosting the prospective participant during the online session in regard to a participant who has included the prospective participant in the user block list of said participant.

27. The system of claim 26, wherein the second action comprises ghosting a participant during the online session, in regard to the participant who was included in the user block list of the prospective participant.

28. The system of claim 27, wherein ghosting comprises preventing communication and transfer of identifying information between a ghosted participant and a ghosting participant in the online session.

29. The system of claim 28, wherein the machine instructions further cause the processor to prevent any participant who is ghosted from determining an identification of the ghosting participant.

30. The system of claim 18, wherein the session block filter represents all persons identified in the user block lists of the participants by setting bit positions in the session block filter determined by repetitively applying related but different mathematical functions to the unique identifier for each person in the user block lists; wherein said user filter includes bit positions that are set in the user filter and are determined by repetitively applying the related but different mathematical functions to the unique identifier for each participant in the online session; and, wherein the prospective participant is compared with the persons represent in the session block filter by:
(a) repetitively applying the related but different mathematical functions to a unique identifier of the prospective participant in the online session, to determine corresponding bit positions in the session block filter; and
(b) comparing the corresponding bit positions determined for the prospective participant with the bit positions that are set in the session block filter for the online session.

31. The system of claim 30, wherein the related but different mathematical functions comprise hashes.

32. The system of claim 30, wherein comparing the corresponding bit positions determined for the prospective participant is carried out matchmaking server computing device, a session host computing device, and a computing device that is peer-to-peer with the computing device of the prospective participant.

33. The system of claim 30, wherein if the corresponding bit positions determined for the prospective participant have been set in the session block filter, there is a substantial probability that the prospective participant was included in a user block list of at least one participant in the online session, but if any of the corresponding bit positions determined for the prospective participant are not set in the session block filter, then the prospective participant is definitely not included in the user block list of any participant in the online session.

34. The system of claim 18, wherein the online session comprises a game that is played by the participants over a network.

35. A method for limiting an interaction between a first party and a second party, in connection with an online session, comprising the steps of:
 (a) creating a filter for the first party that indicates one or more persons whose interaction with the first party in the online session is to be limited, the creating comprising bitwise-ORing unique identifiers of the one or more persons, wherein the filter is a fixed-length bitmap and contains an aggregate indication of the one or more persons indicated by the first party;
 (b) creating a test result based upon an indicator for the second party; and
 (c) comparing the test result to the filter to determine if the second party is included among the one or more persons indicated in the filter, and if so, limiting an interaction between the first and second parties in the online session.

36. The method of claim 35, wherein the step of limiting comprises the step of blocking the second party from participating in the online session with the first party.

37. The method of claim 35, wherein the step of limiting comprises the step of ghosting the second party in regard to the first party in the online session.

38. The method of claim 37, wherein the second party is invisible to the first party during the online session.

39. The method of claim 37, wherein the first party is invisible to the second party during the online session.

40. The method of claim 35, wherein the step of limiting comprises the step of ghosting the first party in regard to the second party in the online session.

41. The method of claim 40, wherein the first party is invisible to the second party during the online session.

42. The method of claim 40, wherein the second party is invisible to the first party during the online session.

43. The method of claim 35, wherein the step of limiting comprises the step of preventing communications from one of the first and the second party to the other of the first and the second parties.

44. The method of claim 35, wherein the step of limiting comprises the step of enabling at least one of the first and the second parties to affect a state of the other within the online session, without being associated with distinguishing information.

45. The method of claim 35, wherein the first party and the second party are both enabled to join the online session, and wherein the step of limiting comprises the steps of:
 (a) enabling the first party to become aware of the second party participating in the online session;
 (b) preventing the second party from determining that the first party is participating in the online session; and
 (c) preventing the second party from determining that interaction between the first party and the second party has been limited.

46. The method of claim 35, wherein the step of limiting interaction comprises at least one of the steps of:
 (a) blocking the second party from joining the online session;
 (b) preventing communication between the first and the second parties within the online session; and
 (c) preventing the second party from receiving identifying information regarding the first party during the online session.

47. The method of claim 35, further comprising the steps of:
 (a) creating a filter for the second party that indicates people whose interaction with the second party in the online session is to be limited;
 (b) creating a test result based upon an indicator of the first party; and
 (c) comparing the test result that is based upon the indicator of the first party to the filter for the second party to determine if the first party is among the people indicated in the filter for the second party, and if so bidirectionally limiting the interaction between the first party and the second party in the online session.

48. The method of claim 35, further comprising the steps of:
 (a) creating a user filter that indicates participants in the online session;
 (b) creating a user block filter that indicates people with whom the second party wants to limit interaction during the online session; and
 (c) comparing the user block filter with the participants indicated in the user filter to determine if a person with whom the second party wants to limit interaction is included among the participants in the online session.

49. The method of claim 48, wherein if the second party has not been precluded from participating in the online session, and if any person with whom the second party wants to limit interaction is included among the participants, further comprising the step of enabling the second party to selectively determine whether to participate in the online session.

50. The method of claim 35, wherein the step of limiting interaction is carried out by an online session host.

51. A memory medium having machine instructions for carrying out the steps of claim 35.

52. A memory medium having machine instructions for carrying out the steps of claim 36.

53. A system for limiting an interaction between a first party and a second party, in connection with an online session, comprising:
 (a) a memory in which a plurality of machine instructions are stored;
 (b) a network interface that is coupled to a network for use in communicating with other computing devices:
 (c) a processor coupled to the memory and to the network interface, said processor executing the machine instructions to carry out a plurality of functions, including:
  (i) accessing a filter for the first party that indicates one or more persons whose interaction with the first party in the online session is to be limited, wherein the filter is a fixed-length bitmap and contains an aggregate indication of the one or more persons, and wherein the filter is created by bitwise-ORing unique identifiers of the one or more persons indicated by the first party;
  (ii) determining a test result based upon an indicator of the second party; and
  (iii) comparing the test result to the filter to determine if the second party is included in the people indicated by the filter, and if so, limiting an interaction between the first and second parties in the online session.

54. The system of claim 53, wherein the machine instructions further cause the processor to create the filter for the first party.

55. The system of claim 53, wherein the processor limits the interaction by doing at least one of:
   (a) blocking the second party from joining the online session;
   (b) preventing communication between the first and the second parties within the online session; and
   (c) preventing the second party from receiving identifying information regarding the first party during the online session.

56. The system of claim 53, wherein the processor limits interaction by ghosting the second party inregard to the first party in the online session.

57. The system of claim 53, wherein the processor limits interaction by ghosting the first party in regard to the second party in the online session.

58. The system of claim 53, wherein the processor limits interaction by preventing communication between the first party and the second party during the online session.

59. The system of claim 53, wherein the processor limits interaction by enabling at least one of the first and the second parties to affect a state of the other within the online session, without being associated with distinguishing information.

60. The system of claim 53, wherein the machine instructions cause the processor to enable both of the first party and the second party to participate in the online session, but wherein the processor limits the interaction by:
   (a) enabling the first party to become aware of the second party participating in the online session;
   (b) preventing the second party from determining that the first party is participating in the online session; and
   (c) preventing the second party from determining that interaction between the first party and the second party has been limited.

61. A method automatically performed by a computing device for controlling an interaction between participants in an online session, based upon block lists of the participants, wherein a block list of a participant identifies one or more persons with whom interaction with the participant in an online session should be controlled in a specific manner, comprising the steps of:
   (a) creating a session block filter from the user block lists of the participants in the online session by bitwise-ORing a plurality of bloom filters of the participants, each of the plurality of bloom filters being a fixed length bitmap that aggregates a user block list of a participant, each user block list of a participant including a unique identifier for each person in said user black list with whom interaction with the participant in the online session is to be controlled in the specific manner, wherein said session block filter is a fixed length bitmap that contains an aggregate indication of all persons identified in the user block lists of all the participants; and
   (b) comparing the prospective participant with the persons represented in the session block filter for the online session to determine if interaction with any participant in the online session by the prospective participant must be controlled in the specific manner, and if so, taking a first action applied to control an interaction between the prospective participant and participants in the online session.

62. The method of claim 61, further comprising the steps of:
   (a) creating a user filter that represents all participants in the online session, each participant being indicated with a unique identifier;
   (b) creating a user block filter for the prospective participant to represent persons with whom interaction with the prospective participant in the one session is to be controlled in the specific manner; and
   (c) comparing the persons indicated in the user block filter of the prospective participant with the user filter for the participants in the online session, to determine if any participant in the online session is included in the user block list of the prospective participant, and if so. taking a second action applied to further control an interaction between the prospective participant and participants in the online session.

63. The method of claim 62, further comprising the steps of:
   (a) creating a session block filter from user block lists of the participants in the online session, wherein each user block list of a participant includes a unique identifier for each person in said user block list with whom interaction with the participant in the online session is to be controlled in the specific manner, said session block filter representing all persons identified in the user block lists of the participants; and
   (b) comparing the prospective participant with the persons represented in the session block filter for the online session to determine if interaction with any participant in the online session by the prospective participant must be controlled in the specific manner, and if so, taking a second action applied to further control an interaction between the prospective participant and participants in the online session.

64. A method for controlling an interaction between participants in an online session, comprising the steps of:
   (a) creating a user filter that represents all participants in the online session by bitwise-ORing unique identifiers of the participants in the online session, each unique identifier identifying one of the participants, wherein the user filter is a fixed-length bitmap and contains aggregate indication of all the participants in the online session;
   (b) creating a user block filter for a prospective participant to represent persons with whom interaction with the prospective participant in the online session is to be controlled in the specific manner, the creating comprising bitwise-ORing each unique identifier of the persons, wherein the user block filter is a fixed-length bitmap and contains an aggregate indication of the persons indicated by the prospective participant; and
   (c) comparing the persons indicated in the user block filter of the prospective participant with the user filter for the participants in the online session, to determine if any participant in the online session is included in the user block list of the prospective participant, and if so, taking a first action applied to control an interaction between the prospective participant and participants in the online session.

* * * * *